US012733696B2

(12) United States Patent
Mah et al.

(10) Patent No.: US 12,733,696 B2
(45) Date of Patent: Sep. 15, 2026

(54) HARNESS LEG LOOP

(71) Applicant: Amer Sports Canada Inc., North Vancouver (CA)

(72) Inventors: Jason Jeremy Mah, Vancouver (CA); Thomas W. C. Fayle, North Vancouver (CA); Gordon J. Betenia, North Vancouver (CA)

(73) Assignee: Amer Sports Canada Inc., North Vancouver (CA)

( * ) Notice: Subject to any disclaimer, the term of this patent is extended or adjusted under 35 U.S.C. 154(b) by 100 days.

(21) Appl. No.: 19/044,257

(22) Filed: Feb. 3, 2025

(65) Prior Publication Data

US 2025/0178792 A1 Jun. 5, 2025

Related U.S. Application Data

(63) Continuation-in-part of application No. 18/596,257, filed on Mar. 5, 2024, now Pat. No. 12,415,654, which is a continuation of application No. 17/482,859, filed on Sep. 23, 2021, now Pat. No. 11,930,891, which is a continuation of application No. 15/654,533, filed on Jul. 19, 2017, now Pat. No. 11,147,328.

(51) Int. Cl.

| | |
|---|---|
| ***A41D 13/00*** | (2006.01) |
| ***A41F 1/00*** | (2006.01) |
| ***A41F 9/02*** | (2006.01) |
| ***A62B 35/00*** | (2006.01) |
| *B65D 33/28* | (2006.01) |

(52) U.S. Cl.

CPC .......... *A41D 13/0007* (2013.01); *A41F 9/025* (2013.01); *A62B 35/00* (2013.01); *A62B 35/0025* (2013.01); *A41F 1/00* (2013.01); *A41F 9/02* (2013.01); *B65D 33/28* (2013.01)

(58) Field of Classification Search

CPC ....... A62B 35/00; A62B 35/0025; A41F 1/00; A41F 9/02; A41F 9/025; A63B 35/00; A63B 35/0025

USPC .............................................................. 182/6

See application file for complete search history.

(56) References Cited

U.S. PATENT DOCUMENTS

| | | | | |
|---|---|---|---|---|
| 321,962 | A | | 7/1885 | Goodman |
| 1,092,955 | A | | 4/1914 | Shaver |
| 1,697,270 | A | | 1/1929 | Fischer |
| 1,979,508 | A | | 11/1934 | Van Den Bel |
| 2,065,780 | A | | 12/1936 | Weiss |
| 2,181,353 | A | | 11/1939 | Wenk, Jr. |
| 2,349,019 | A | | 5/1944 | Terrell |
| 2,541,713 | A | | 2/1951 | Neilson |
| 2,600,395 | A | | 6/1952 | Domoj |
| 2,854,670 | A | | 10/1958 | Naccash |
| 3,029,853 | A | | 4/1962 | Piazze |
| 3,091,772 | A | | 6/1963 | Hebras |
| 3,413,657 | A | | 12/1968 | Sherriff |
| 3,424,134 | A | * | 1/1969 | Rosenblum ........ A62B 35/0037 244/151 R |

(Continued)

*Primary Examiner* — Jocelyn Bravo

(74) *Attorney, Agent, or Firm* — Terence P. OBrien; Todd A. Rathe

(57) ABSTRACT

Various example harness leg loops may include a flexible perimeter defining a closable circumference. The size of the closable circumference is maintained by a constricting tube in tension and is adjustable by releasing the constricting tube from tension.

20 Claims, 18 Drawing Sheets

(56) References Cited

U.S. PATENT DOCUMENTS 3,583,749 A * 6/1971 Hopkins ................ D07B 1/185 294/82.11
3,703,775 A 11/1972 Gatti
4,245,408 A 1/1981 Larsen
4,477,928 A 10/1984 Graff
4,543,672 A 10/1985 Levy
4,786,189 A 11/1988 Broderick
4,792,241 A 12/1988 Broderick
4,850,946 A 7/1989 Broderick
4,993,128 A 2/1991 Gold
5,040,244 A 8/1991 Tubbs
5,062,344 A 11/1991 Gerker
5,145,027 A * 9/1992 Petzl .................. A62B 35/0031 119/770
5,158,428 A 10/1992 Gessner
5,203,829 A * 4/1993 Fisk ................... A62B 35/0031 119/857
5,283,910 A 2/1994 Flint
5,289,590 A * 3/1994 Larson ............... A41D 13/0007 2/227
5,615,750 A * 4/1997 Phillips ............. A62B 35/0012 182/7
5,699,657 A * 12/1997 Paulson ................. D07B 1/185 57/22
5,797,787 A 8/1998 Kaye
5,996,256 A 12/1999 Zebe, Jr.
6,006,860 A * 12/1999 Bell ................... A62B 35/0025 182/18
6,052,921 A 4/2000 Oreck
6,073,270 A 6/2000 Schnabl
6,081,930 A 7/2000 Phillips
6,092,932 A 7/2000 Pekala
6,244,379 B1 * 6/2001 Larson ............... A62B 35/0025 182/7
6,253,874 B1 * 7/2001 Casebolt ................ B64D 17/30 182/6
6,317,894 B1 11/2001 Blechman
6,431,313 B1 * 8/2002 Petzl .................. A62B 35/0025 119/857
6,435,391 B1 8/2002 Vazquez
6,513,210 B1 2/2003 Gonzalez
6,618,863 B2 9/2003 Blechman
7,445,085 B2 * 11/2008 Petzl .................. A62B 35/0012 2/310
8,443,937 B2 * 5/2013 Mordecai ........... A41D 13/0007 182/3
8,714,425 B2 5/2014 Meyer
9,554,614 B2 1/2017 Follet
9,642,418 B2 5/2017 Kopcienski
9,930,922 B2 4/2018 Follet
10,143,865 B2 * 12/2018 Franke ............... A62B 35/0025
10,405,608 B2 9/2019 Dyer
11,147,328 B2 10/2021 Fayle
11,930,891 B2 3/2024 Fayle
2002/0029407 A1 3/2002 Blechman
2004/0250388 A1 12/2004 Martin
2005/0072530 A1 * 4/2005 Petzl .................. A62B 35/0012 160/3
2007/0071568 A1 3/2007 Dorstewitz
2007/0130799 A1 6/2007 Seliger
2008/0216351 A1 9/2008 Carroll
2009/0078501 A1 * 3/2009 Mordecai ........... A41D 13/0007 182/7
2010/0175278 A1 7/2010 Seliger
2010/0275344 A1 11/2010 Demarest
2012/0272433 A1 11/2012 Silver
2014/0047619 A1 2/2014 Singh
2014/0075648 A1 3/2014 Haueter
2014/0196316 A1 7/2014 Follet
2014/0290016 A1 10/2014 Lovett
2015/0089780 A1 4/2015 Kopcienski
2015/0342287 A1 12/2015 Follet
2016/0044975 A1 * 2/2016 Linden ............... A41D 13/0007 2/227
2016/0096044 A1 * 4/2016 Franke ............... A62B 35/0025 57/22
2017/0325531 A1 11/2017 Lomax
2018/0110295 A1 4/2018 Dyer
2018/0184739 A1 7/2018 Saturnio
2019/0053568 A1 2/2019 Choukeir

* cited by examiner

34

HARNESS LEG LOOP

CROSS REFERENCE TO RELATED APPLICATIONS

The present application is a continuation-in-part application claiming priority under 35 U.S.C. § 120 from co-pending U.S. patent application Ser. No. 18/596,257 filed on Mar. 5, 2024, which is a continuation of U.S. patent application Ser. No. 17/482,859 filed on Sep. 23, 2021, and entitled CIRCUMFERENCE CLOSING SYSTEM (now U.S. Pat. No. 11,930,891), which is a continuation of U.S. patent application Ser. No. 15/654,533 filed on Jul. 19, 2017 (now U.S. Pat. No. 11,147,328), the full disclosures of which are hereby incorporated by reference. The present application further claims priority under 35 U.S.C. § 120 from co-pending U.S. patent application Ser. No. 18/942,332 filed on Nov. 8, 2024, and entitled BUCKLE, the full disclosure of which is hereby incorporated by reference. The present application also claims priority under 35 U.S.C. § 120 from co-pending U.S. patent application Ser. No. 18/943,179 filed on Nov. 11, 2024, and entitled HARNESS, the full disclosure of which is hereby incorporated by reference.

BACKGROUND

Many pieces of apparel or garments are worn about a person's waist and have a closable waist, a waist that may be constricted to adapt to individual waist sizes as well as personal preferences. Other garments extend over a person's torso and can include a constrictable bottom opening or midsection, such as draw strings. Such garments come in a variety of different forms such as running shorts, swim shorts, sweatpants, slacks, skirts, bibs, jackets, coats, vests, hoodies, pullovers, sweatshirts, shirts, and the like. Footwear articles have a variety of different lacing or closing systems. Climbing harnesses and other types of harnesses extend around both the waist and thighs of the person wearing harness. Various mechanisms are currently used to control the constriction of the closable waist, thigh receiving leg loops, and the foot opening of footwear, such as a belt, hook and loop fasteners, tri-glides, webbings, snaps, clips, laces and the like. Such mechanisms may fail, slide or loosen when unloaded or slide or loosen under load. Moreover, such mechanisms may add undesirable hardware, may be weak, may add undesirable amounts of weight, may limit movement, may be difficult to use, or may increase the bulk of the closable waist of the garment, the leg loops or the footwear.

DETAILED DESCRIPTION OF EXAMPLES

Disclosed herein are example garments that provide a closable circumference or waist and that utilize a circumference closing system that utilizes at least one constrict-able tubular length to releasably retain a selected size of the closable circumference. The disclosed circumference closing system may be used to supplement or replace existing mechanisms or hardware in a variety of garments and other applications. The disclosed circumference closing system may eliminate undesirable hardware, may reduce the weight of the garment, may increase movement or flexibility of the garment or may reduce the bulk of the closable waist of the garment.

Disclosed are example harnesses having example leg loops provided with circumference closing systems. The circumference closing systems allow a person wearing the harness to adjust the size or diameter of the individual leg loops to accommodate differently sized thighs or different user preferences. The example circumference closing systems utilize at least one constricting or constrict-able tubular length to releasably retain a selected size of the leg loop. The example circumference closing systems may be used to supplement or replace existing mechanisms or hardware in the leg loops. The disclosed circumference closing systems may eliminate undesirable hardware, may reduce the weight of the harness, may increase movement or flexibility of the harness or may reduce the bulk of the harness.

For purposes of this disclosure, the term “coupled” shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature.

For purposes of this disclosure, the phrase “configured to” denotes an actual state of configuration that fundamentally ties the stated function/use to the physical characteristics of the feature proceeding the phrase “configured to”.

For purposes of this disclosure, the term “releasably” or “removably” with respect to an attachment or coupling of two structures means that the two structures may be repeatedly connected and disconnected to and from one another without material damage to either of the two structures or their functioning.

Figure 1:
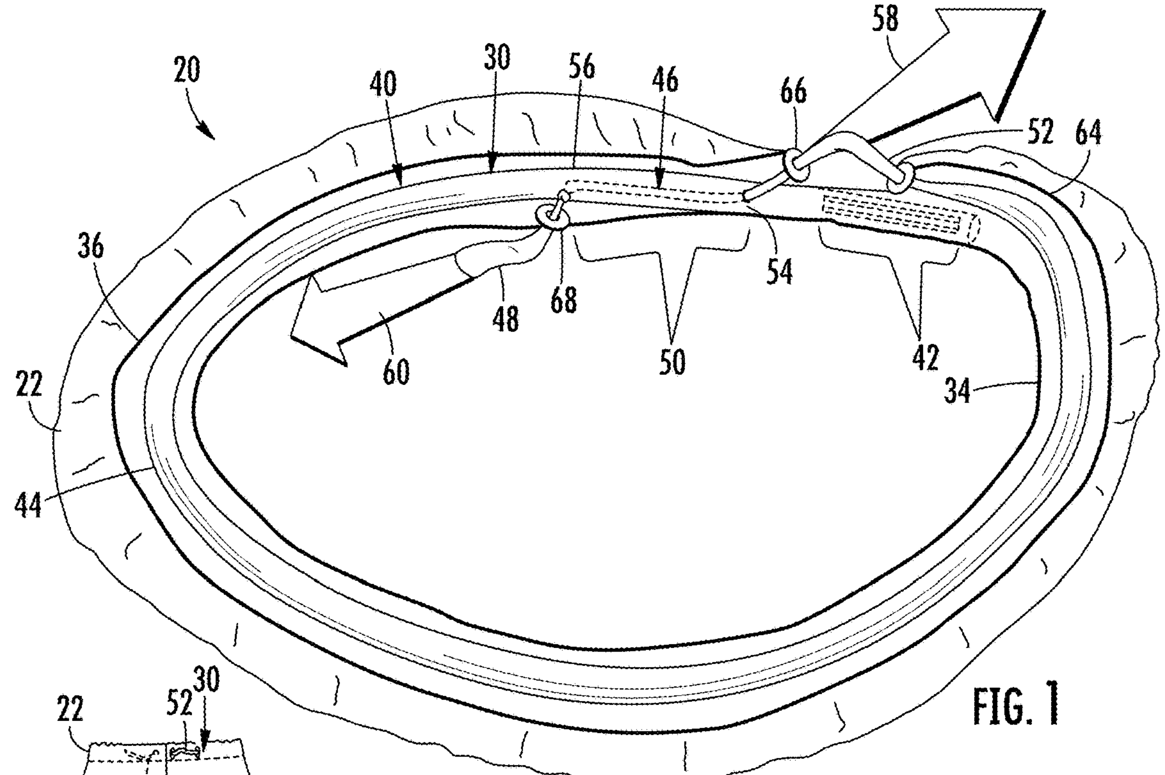
FIG. 1 is a fragmentary top view of a portion of an example garment that incorporates an example circumference closing system.
Figure 2:
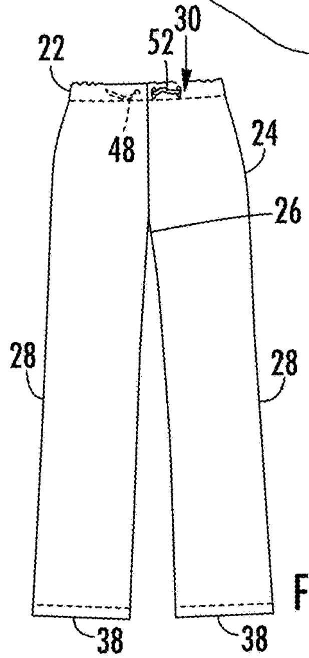
FIG. 2 is a front view of the example garment of FIG. 1.

FIGS. 1 and 2 illustrate an example garment 20, shown as a generic pair of pants. FIG. 1 is a top view of a portion of pants 20 while FIG. 2 is a front view of pants 20. Pants 20 may have various forms and configurations and go by various name other names such as slacks, sweatpants, trousers, tights, jeans, gauchos, pedal pushers, palazzos, pajamas, jodhpurs, knickers, bibs and the like.

As shown by FIG. 2, pants 20 generally comprises waist portion 22, hips portion 24, crotch 26, leg portions 28 and circumference closing system 30. Waist portion 22 comprise a body of material, such as woven material providing a constricted or constrict-able opening 34 that receives a person’s waist and that supports the remaining portions of pants 20 when being worn by a person. As shown by FIG. 1, in the example illustrated, waist portion 22 has an internal sleeve 36 that receives portions of circumference closing system 30.

In one implementation, waist portion 22 provides a continuous uninterrupted body of material that continuously extends about a person’s waist. One example of such an implementation is pants having an uninterrupted body of material that continuously extends about a person’s waist is sweatpants. In another implementation, waist portion 22 may be split or have a front zipper, wherein opposite sides of the split are temporarily clasped, buttoned or otherwise secured to one another. In other examples, pants can include one or more side zippers or reclosable slits or splits. In all such cases, waist portion 22 is flexible and/or compressible so as to be constrict-able, facilitating adjustment of the size of waist portion 22 through the use of circumference closing system 30.

Hips portion 24 comprise that portion of pants 20 extending from waist portion 22 to crotch 26. Hips portion 24 extends about a person’s hips when pants 20 is worn. In some implementations, hips portion 24 may have at least one pocket secured thereto on the front or sides.

Leg portions 28 extend from hips portion 24, beginning at crotch 26 and terminating at leg openings 38. The distance between crotch 26 and leg openings 38 is sometimes referred to as an inseam. Although illustrated as substantially straight, leg portions 26 may have a variety of shapes and configurations such as loose fit, tapered, bell bottom and the like.

Circumference closing system 30 engages waist portion 22 and is closable or constrict-able so as to adjust the circumference or the interior size of waist portion 22 to accommodate different size waists and/or other undergarments of users who may be wearing garment 20. Circumference closing system 30 comprises a single line 40 at least partially received within sleeve 36. Line 40 comprises portions 42, 44, 46, 48 and 50.

Portion 42 comprises a first end portion of line 40 secured to waist portion 22. In one implementation, portion 42 is stitched to waist portion 22. In another implementation, portion 42 is welded, bonded or otherwise secured to waist portion 22.

Portion 44 of line 40 extends from portion 42 and continues along waist portion 22, within sleeve 36, about substantially an entirety of the closable circumference of waist portion 22. In the example illustrated, portion 44 comprises a constrict-able tubular length 50 and an exposed portion 52. Constrict-able tubular length 50 comprises a length of line 40 which is in the form of a hollow tube, and which constricts or narrows in diameter in response to axial loads placed upon the tube forming constrict-able length 50. In one implementation, the entire length of line 40 is a constrict-able tube. For example, in one implementation, the entire length of line 40 comprises a braided tube of material. In another implementation, the entire length of lines 40 comprises a tube of a resiliently flexible material, such as a resiliently flexible or stretchable elastic material or rubber-like material. In other implementations, constrict-able tubular length 50 may comprise a portion of line 40, wherein other portions of line 40 are not tubular or are not constrict-able.

Portion 46 comprises that portion of line 40 that is extending through the hollow interior of constrict-able tubular length 50, entering at entry 54 and exiting at exit 56. Portion 46 is sized to enable portion 46 to pass through the constrict-able tubular length 50. Portion 48 comprises that portion of line 40 that extends from exit 56 and from length 50. Portion 48 provides a segment of line 40 by which a person may grasp and pull line 40 to adjust a length of line 40 that extends from portion 42, about the waist of the person wearing garment 20, and to the constriction of length 50. In one implementation, portion 48 is a loose, unattached second end of line 40. In another implementation, an end of portion 48 may be secured to waist portion 22 so as to not hang or dangle.

Exposed portion 52 comprises a segment of portion 44 of line 40 that is exposed outside of waist portion 22 and sleeve 36 such that a person may grasp portion 52 to pull back portion 48 through length 50 (as indicated by arrow 58), shortening the exposed length of portion 48 and increasing the length of portion 44 extending between the constriction of length 50, about the waist of the person wearing garment 20 and back to portion 42. In other words, exposed portion 52 facilitates lengthening of portion 44 and widening of the closable circumference of waist portion 22.

In the example illustrated, sleeve portion 36 and waist portion 22 comprise openings 64, 66 and 68. In one implementation, each of opening 64, 66 and 68 may be defined or protected by a grommet or other lining. Opening 64 comprise an opening from which portion 44 exits sleeve 36 and waist portion 22. Opening 66 comprises an opening into which portion 44 reenters sleeve 36 and waist portion 44, further extending towards constrict-able tubular length 50. Openings 64 and 66 facilitate the provision of exposed portion 52, allowing line 44 to be loosened when the size of waist portion 22 is to be increased. Opening 68 comprise an opening in sleeve 36 and waist portion 22 through which portion 48 exits, facilitating grasping a portion 48 when waist portion 22 is be constricted, closed or reduced in size.

When a person wishes to reduce or constrict the size of closable circumference of waist portion 42, the person may pull portion 48 through length 50 (as indicated by arrow 60), increasing the length of portion 48 and reducing the length of portion 44 extending between the constriction of length 50, about the waist of the person wearing garment 20 in back to portion 42. After the length of portion 44 in the size of the closable circumference of waist portion 22 have been established, circumference closing system 30 retains the chosen size of the closable circumference of waist portion 42. Outward forces exerted upon waist portion 42 and upon line 44 place an axial load on length 50 which constricts about and against portion 46. The constriction of portion 50 about portion 46 frictionally locks portion 50 about the entire circumference or about all sides of portion 46, inhibiting axial sliding movement of portion 46 within the hollow interior of constrict-able tubular length 50.

As shown by FIG. 1, circumference closing system 30 provides garment 20 with a user selectable waist portion circumference or size that is reliably retained. Circumference closing system 30 provides garment 20 with an easily adjustable waist portion 22 without requiring the use of a belt, clasps, buttons, buckles, fasteners and the like which might otherwise add undesirable amounts of weight, bulk and/or complexity to the closing system and/or limit movement or flexibility of garment 20. Although circumference closing system 30 is illustrated as being part of pants 20, circumference closing system 30 may be used in waist portions of other pieces of apparel or other garments.

Figure 3:
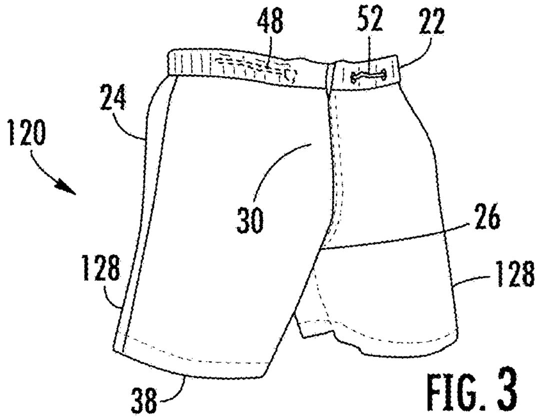
FIG. 3 is a front perspective view of another example garment incorporating the example circumference closing system.

FIG. 3 illustrates another example piece of apparel or garment 120 which comprises circumference closing system 30. Garment 120 is in the form of a pair of shorts. For purposes of this disclosure, the term "shorts" refers to any garment worn about a person's waist having shorter leg portions than the leg portions 28 of pants 20 or no leg portions. "Shorts" also refers to any garment about a person's waist that have leg openings leg openings that are to be located above the person's ankles, above a person's knees or in some implementations, reach only to a person's thighs. The term "shorts" comprises all forms of shorts including hiking shorts, casual shorts, compression shorts, short tights, swim trunks, capris, skorts and culottes.

As shown by FIG. 3 garment 120 comprises waist portion 22, hips portion 24, crotch portion 26, leg portions 128 and circumference closing system 30. Waist portion 22, hips portion 24, crotch portion 26 and circumference closing system 30 are described above. Leg portions 128 are similar to leg portions 28 except that leg portions 128 are shorter. In the example illustrated, leg portions 128 are sized so as to provide leg openings 38 which are to be located between the thighs and knees of a person wearing garment 120. In other implementations, leg portions 128 may be sized so as to provide leg opening 38 closer to crotch 26 or below a person's knees when garment 120 is worn. In other implementations, one or more of the leg portions 28 or one or more leg openings 38 may include circumference closing system 30.

Figure 4A:
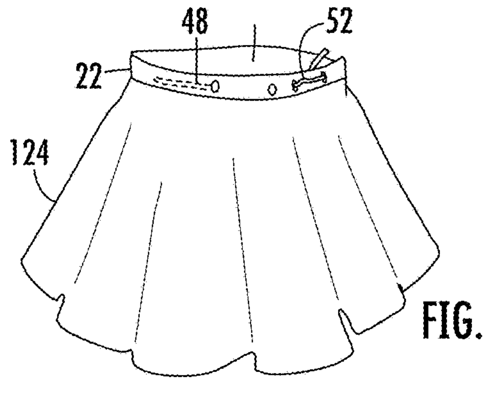
FIGS. 4*a* and 4*b* are front perspective views of other example garments incorporating the example circumference closing system.

FIG. 4*a* illustrates another example piece of apparel or garment 220 which comprises circumference closing system 30. Garment 220 is in the form of a skirt. For purposes of this disclosure, the term "skirt" refers to any garment worn about a person's waist and generally lacking a crotch or inseam. Examples of different types of skirts include, but not limited to, A-line skirts, broomstick skirts, bubble skirts, circular skirts, dirndl skirt, fishtail skirts, flared skirts, gored skirts, fly skirts, sheath, multi-panel skirts, box please skirts, knife pleats skirts, fix-box pleated skirts, prairie skirts, kilts, wrap skirts, jean skirts, tiered skirts, pencil skirts, sarongs, parebs, tulle skirts, handkerchief skirts, trumpet skirts, round skirts, wrap skirts, bazi skirt, cowl skirts, godet skirts and the like.

As shown by FIG. 4*a*, garment 220 comprises waist portion 22, skirt body 124 and circumference closing system 30. Waist portion 22 and circumference closing system 30 are described above. Skirt body 124 hangs from waist portion 22. As described above, skirt body 124 may be provided in different sizes, shapes and configurations and formed from a single panel or multiple panels of material.

Figure 4B:
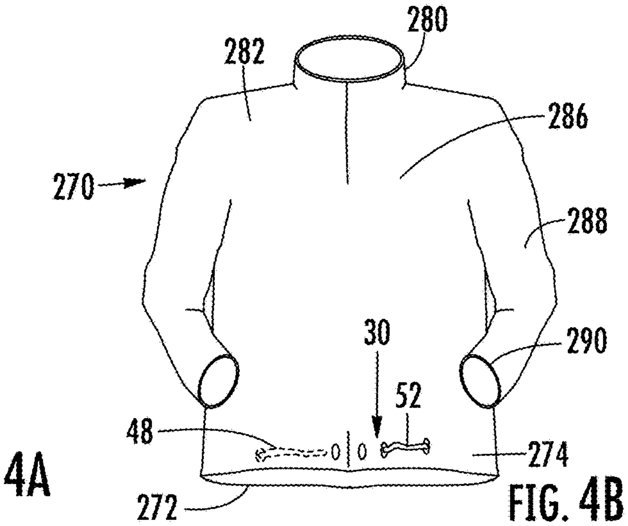

FIG. 4*b* illustrates another example piece of apparel or garment 270 which comprises circumference closing system 30. Garment 220 is in the form of a pullover jacket. For purposes of this disclosure, the term "jacket" refers to any garment worn about a person's torso including coats, vests, hoodies, pullovers (which are pulled over a person's head) and the like. Although FIG. 4*b* illustrates a pullover jacket, the closing system 30 can be applied to any jacket. The jacket includes a neck region 280, shoulder regions 282, a torso region 286 and arms 288, and an open lower end 272. A constrict-able region 274 can be positioned at the lower end 272 and/or at other locations about jacket. The arms 288 include arm openings 290. For example, a longer jacket can extend below a user's waist and may include a first constrict-able region 274 at the waist of the user and/or a second constrict-able region 274 at the open lower end 272 below the waist of the user. Garment 270 includes the circumference closing system at the constrict-able region 274 for selectably adjusting the size of the open lower end and/or the constrict-able region. In other implementations, one or more of the arm openings 290 may include circumference closing system 30.

Figure 5A:
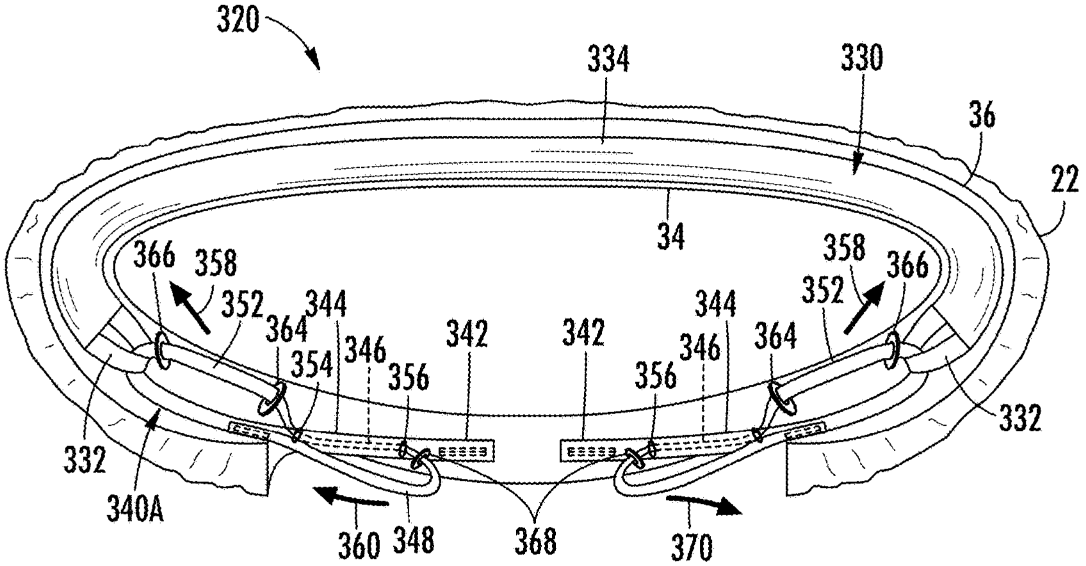
FIGS. 5*a* through 5*d* are fragmentary top views of portions of example garments incorporating other example implementations of circumference closing systems.

FIG. 5*a* illustrates another example garment 320. Garment 320 may have the general form of any of garments 20, 120, 220 and 270 described above except that garment 320 comprises circumference closing system 330. Garment 320 comprises waist portion 22 of a closed system having a continuous waist portion 22 without a separation. In one implementation, waist portion 22 of garment 330 comprises a sleeve 36. In other implementations, sleeve 36 may be omitted. Although circumference closing system 330 is illustrated as being largely contained within waist portion 22, in other implementations, larger portions if not the entirety of circumference closing system 330 may be exposed or external to waist portion 22.

Circumference closing system 330 operates in a somewhat similar fashion to circumference closing system 30 except that circumference closing system 330 utilizes a pair of loops and a pair of lines, wherein adjustment of waist portion 22 occurs through the pair of loops. As shown by FIG. 5*a*, system 330 comprises loops 332 and lines 340A, 340B (collectively referred to as line 340). Loops 332 are located on a front side of garment 320 along waist portion 22 and are connected to portions of waist portion 22 that collectively extend about the remainder of waist portion 22. In the example illustrated, circumference closing system 330 additionally comprises a band 334 extending within sleeve 36 which has opposite ends secured to loops 332 and extends about the remainder of the interior circumference 34 of waist portion 22. In other implementations, band 334 may be omitted where loops 332 are affixed to other portions of waist portion 22 or other locations of a garment.

Lines 340 facilitate selected drawing of loops 332 towards one another or the release of such loops 332 to allow movement away from one another so as to thereby adjust the circumference, size or extent of constriction of opening 34 of waist portion 22. Each of lines 340 is substantially similar or identical to one another except that lines 340A, 340B mirror one another on opposite sides of a front centerline of garment 320. Each of lines 340 comprises portions 342, 344, 346, 348 and 350.

Figure 5B:
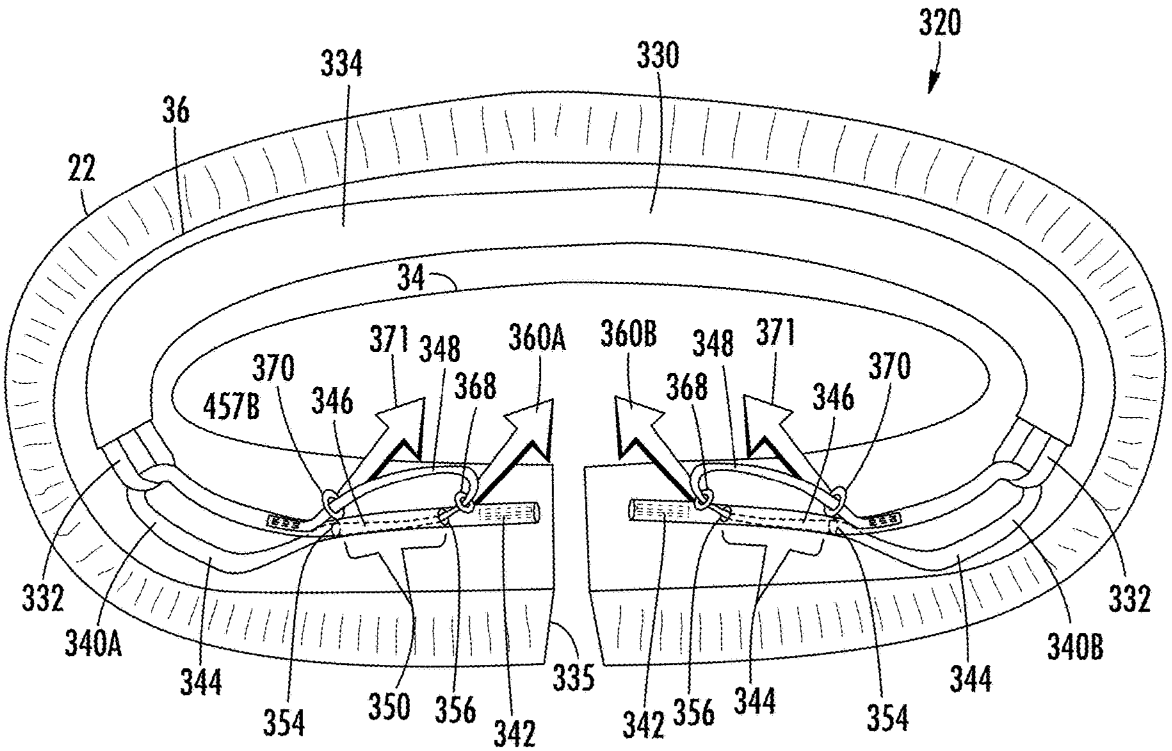

Portion 342 comprise an end portion of line 340A, 340B secured to waist portion 22. In one implementation, portion 342 is stitched to waist portion 22. In another implementation, portion 342 is welded, bonded or otherwise secured to waist portion 22. Referring to FIG. 5*b*, in another implementation, the circumference closing system 330 can be applied to a garment 320 having a separation or break 335 between the portions 342. The separation or break 335 can be a fly of a pant, a full separating jacket hem or other separation.

Referring to FIG. 5*a*, portion 344 of lines 340A, 340B extends from portion 342 and continues through one of loops 332, within sleeve 36, returning towards portion 342. In the example illustrated, portion 344 comprises a constrict-able tubular length 350 and an exposed portion 352. In the example illustrated, portion 344 comprises a constrict-able tubular length 350 and an exposed portion 352. Constrict-able tubular length 350 comprises a length of line 340A, 340B which is in the form of a hollow tube, and which constricts or narrows in diameter in response to axial loads placed upon the tube forming constrict-able length 350. In one implementation, the entire length of line 340A, 340B is a constrict-able tube. For example, in one implementation, the entire length of line 340A, 340B comprises a braided tube of fibrous material. In another implementation, the entire length of line 340 comprises a tube of a resiliently flexible material, such as a resiliently flexible or stretchable elastic material or rubber-like material. In other implementations, constrict-able tubular length 350 may comprise a larger or smaller portion of line 340A, 340B, wherein other portions of lines 340A, 340B are not tubular or are not constrict-able. In still other implementations the constrict-able tubular length 350 can be positioned at any location between portion 342 and the loop 332.

Portion 346 comprises that portion of line 340A, 340B that is extending through the hollow interior of constrict-able tubular length 350, entering at entry 354 and exiting at exit 356. Portion 348 comprises that portion of line 340A, 340B that extends from exit 356 and from length 350. Portion 348 provides a segment of line 340A, 340B by which a person may grasp and pull line 340A, 340B to adjust a length of line 340A, 340B that extends from portion 42, about the waist of the person wearing garment 320, and to the constriction of length 350. In the example illustrated, portion 348 is secured to waist portion 22 at end portion 357. In other implementations, portions 348 may comprise a loose, unattached end.

Exposed portion 352 comprises a segment of portion 344 of line 340A, 340B that is exposed inside of waist portion 22 and sleeve 36 such that a person may grasp portion 352 to pull back portion 346 through length 350 (as indicated by arrows 358), shortening the length of portion 348 and increasing the length of portion 344 extending from the constriction of length 350, through loop 332 and back to portion 342. As the length of portion 348 is pulled back through length 350, length 350 is in an open or un-constricted state (having a larger inner diameter or cross-sectional area as compared to when length 350 is in a constricted state), better allowing portion 348 to be pulled back through length 350 towards loop 332. Exposed portion 352 facilitates lengthening of portion 344 and widening of the closable circumference 34 of waist portion 22.

In the example illustrated, sleeve portion 36 and waist portion 22 comprise openings 364, 366, 368 and 370. In one implementation, each of opening 364, 366, 368 and 370 may be defined or protected by a grommet or other lining. In FIGS. 5*a* and 5*d*, opening 364 comprises an opening from which portion 344 exits sleeve 36 and waist portion 22. Opening 366 comprises an opening into which portion 344 reenters sleeve 36 and waist portion 22, further extending through loop 332 and back towards constrict-able tubular length 350. Openings 364 and 366 facilitate access to exposed portion 352, allowing line 344 to be loosened when the size of waist portion 22 is to be increased.

Referring to FIG. 5*a*, opening 368 comprises an opening in sleeve 36 and waist portion 22 through which portion 348 exits, facilitating grasping of portion 348 when waist portion 22 is to be constricted, closed or reduced in size. Opening 370 allows end portion 357 of portion 348 to extend back into waist portion 22 for securement to waist portion 22.

Referring to FIGS. 5*a* and 5*b*, when a person wishes to reduce or constrict the size of closable circumference 34 of waist portion 22, the person may pull portion 348 through length 350 (as indicated by arrow 360), increasing the length of portion 348 and reducing the length of portion 340A and/or 340B extending from the constriction of length 350, through loop 332 and back to portion 342. After the length of portion 344 and the size of the closable circumference of waist portion 22 have been established, the constriction of portion 350 retains the chosen size of the closable circumference of waist portion 22. Outward forces exerted upon waist portion 22 and upon line portions 344 of lines 340A, 340B place an axial load on length 350 which constricts about and against portion 346. The constriction of portion 350 about portion 346 frictionally locks portion 350 to portion 346 about the entire circumference or on all sides of portion 346, inhibiting axial sliding movement of portion 346 within the hollow interior of constrict-able tubular length 350.

In other implementations end portion 357 could be secured to portion 344 on the opposite side of opening 354 from constrict-able tubular length 350. In FIG. 5*b*, by grasping portion 348 and applying force in direction 371 toward portion 342, a person can take the axial load off of portion 350, reducing the constriction on portion 346 and lengthening portion 344 which increases the total circumference of waist opening 330. One would do this on both sides to achieve the maximum circumference, but this could be performed on one side alone for partial effect. In other implementations in which end portion 357 of portion 348 is unattached, opening 370 may facilitate stowing of the unattached end portion to extend back into waist portion 22 for securement to waist portion 22, if other means of loosening are applied.

Figure 5C:
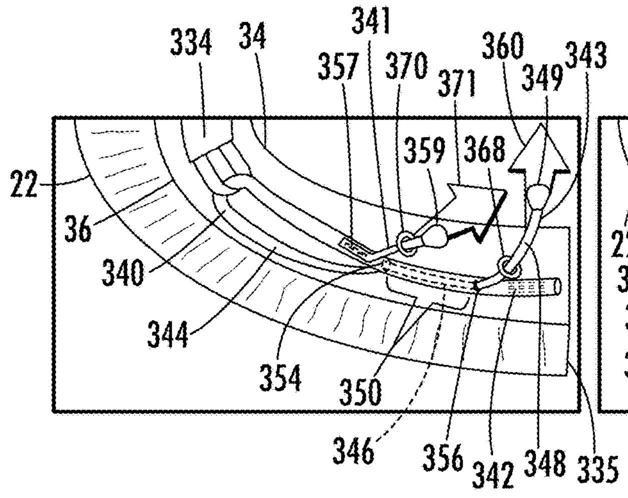
Figure 5D:
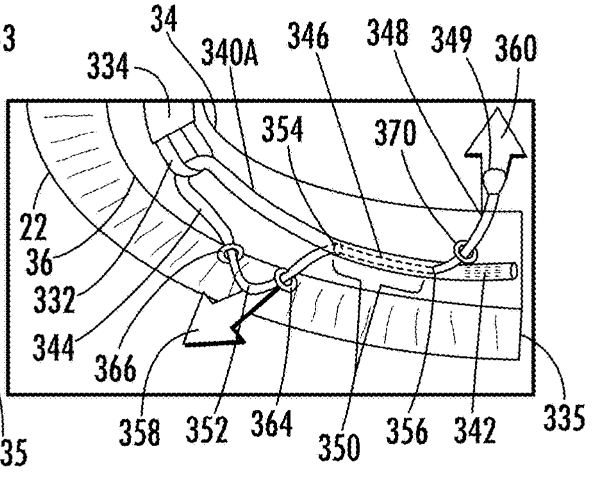

Referring to FIG. 5*c* in one implementation, portion 348 can be divided into tail end portions 341 and 343. End portion 341 passes through opening 370 allowing end portion 357 of portion 341 to extend back into waist portion 22 for securement to waist portion 22. In other implementations end portion 357 could be secured to portion 344 on the opposite side of opening 354 from constrict-able tubular length 350. When portion 348 is divided into tail portions 341 and 343, the tail portion 341 can include a graspable end 359 and the portion 343 can include a graspable end 349. Similar to the implementations of FIGS. 5*a* and 5*b*, when a person wishes to reduce or constrict the size of closable circumference 34 of waist portion 22 of the implementation of FIG. 5*c*, the person may pull end portion 343 through length 350 (as indicated by arrow 360), increasing the length of portion 343 and reducing the length of portion 340 extending from the constriction of length 350, through loop 332 and back to portion 342. When a person wishes to increase the size of closable circumference 34 of waist portion 22 of the implementation of FIG. 5*c*, a person can grasp end portion 341 and apply force in direction 371 toward portion 342, which takes the axial load off of portion 350, reduces the constriction on portion 346, and lengthens portion 344 which increases the total circumference of waist opening 34. One would do this on both sides to achieve the maximum circumference, but this could be performed on one side alone for partial effect.

Referring to FIG. 5*d*, another implementation of the present invention is illustrated with portion 352 providing access for a person to increase the size of closable circumference 34 of waist portion 22 and includes portion 348 as an end portion. When a person wishes to reduce or constrict the size of closable circumference 34 of waist portion 22 of the implementation of FIG. 5*d*, the person may pull end portion 348 through length 350 (as indicated by arrow 360), increasing the length of portion 348 and reducing the length of portion 340A extending from the constriction of length 350, through loop 332 and back to portion 342. When a person wishes to increase the size of closable circumference 34 of waist portion 22 of the implementation of FIG. 5*d*, a person can grasp portion 352 apply force in direction of arrow 358, which takes the axial load off of portion 350, reduces the constriction on portion 346, and lengthens portion 344 which increases the total circumference of waist opening 34. One would do this on both sides to achieve the maximum circumference, but this could be performed on one side alone for partial effect.

As shown by FIGS. 5*a* through 5*d*, circumference closing system 330 provides garment 320 with a user selectable waist portion circumference or size that is reliably retained. Circumference closing system 330 provides garment 320 with an easily adjustable waist portion 22 without requiring the use of a belt, clasps, buttons, buckles, fasteners and the like which might otherwise add undesirable amounts of weight, bulk and/or complexity to the closing system and/or limit movement or flexibility of garment 320. Although circumference closing system 330 is illustrated as being part of pants 20, circumference closing system 30 may be used in other pieces of apparel or other garments. In another implementation, the circumference closing system 330 can be configured with only a single loop 332. In another implementation, the circumference closing system 330 can be configured with only a single line 340A or 340B or with a line 340A or 340B is reduced in size. For example, one of the ends 357 can be directly connected to one of the ends of the band 334 thereby eliminating one of the loops 340A or 340B and/or one of the loops 332.

FIGS. 6*a* through 6*d* illustrate another example garments 420. Garment 420 may have the general form of any of garments 20, 120, 220 and 270 described above except that garment 420 comprises circumference closing system 430. Garment 420 comprises waist portion 22. In one implementation, waist portion 22 of garment 420 comprises a sleeve 36. In other implementations, sleeve 36 may be omitted. Although circumference closing system 430 is illustrated as being largely contained within waist portion 22, in other implementations, larger portions if not the entirety of circumference closing system 430 may be exposed or external to waist portion 22.

Figure 6A:
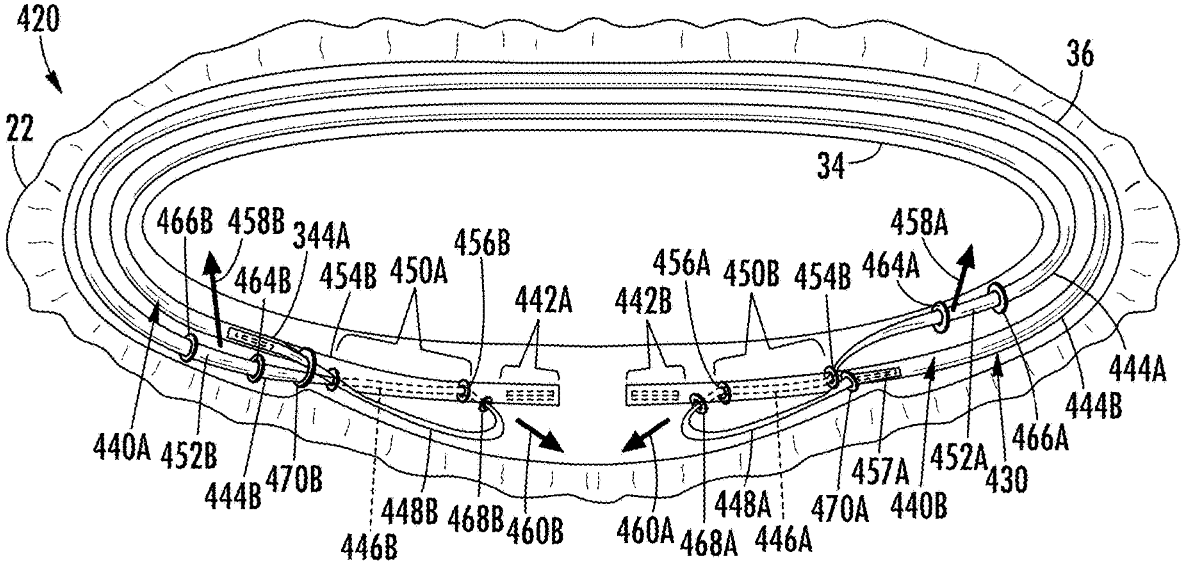
FIGS. 6*a* through 6*d* are fragmentary top views of portions of example garments incorporating other example implementations of circumference closing systems.

Circumference closing system 430 operates in a somewhat similar fashion to circumference closing systems 30 and 330 described above except that circumference closing system 430 utilizes interconnected lines to adjust waist portion 22. As shown by FIG. 6*a*, system 430 comprises lines 440A, 440B (collectively referred to as lines 440).

Lines 440 facilitate adjustment of the circumference, size or extent of constriction of opening 34 of waist portion 22. Each of lines 440 is substantially similar or identical to one another except that lines 440A, 440B mirror one another on opposite sides of a front centerline of garment 420. Line 440A comprises portions 442A, 444A, 446A and 448A.

Portion 442A comprise an end portion of line 440A secured to waist portion 22. In one implementation, portion 442A is stitched to waist portion 22. In another implementation, portion 442A is welded, bonded or otherwise secured to waist portion 22.

Portion 444A of line 440A extends from portion 442 within sleeve 36 and further extends substantially about the entire circumference 34 of waist portion 22. In the example illustrated, portion 444A comprises a constrict-able tubular length 450A and an exposed portion 452A. In the example illustrated, portion 444A comprises a constrict-able tubular length 450A and an exposed portion 452A. Constrict-able tubular length 450A comprises a length of line 440A which is in the form of a hollow tube, and which constricts or narrows in diameter in response to axial loads placed upon the tube forming constrict-able length 450A. In one implementation, the entire length of line 440A is a constrict-able tube. For example, in one implementation, the entire length of line 440A comprises a braided tube of material. In another implementation, the entire length of line 440A comprises a tube of a resiliently flexible material, such as a resiliently flexible or stretchable elastic material or rubber-like material. In other implementations, constrict-able tubular length 450A may comprise a portion of line 440A, wherein other portions of line 440A are not tubular or are not constrict-able.

Portion 446A comprises that portion of line 440A that is extending through the hollow interior of constrict-able tubular length 450B, entering at entry 454A and exiting at exit 456A. Portion 448 comprises that portion of line 440A that extends from exit 456A and from length 450B. Portion 448A provides a segment of line 440A by which a person may grasp and pull line 440A to adjust a length of line 440A that extends from portion 442A, about the waist of the person wearing garment 420, and through the constriction of length 450B. In the example illustrated, portion 448A is secured to waist portion 22 at end portion 457A so as not to hang or dangle. In other implementations, portions 448A may comprise a loose, unattached end.

Exposed portion 452A comprises a segment of portion 444A of line 440A that is exposed outside of waist portion 22 and sleeve 36 such that a person may grasp portion 452A to pull back portion 448A through length 450B (as indicated by arrow 458A), shortening the length of portion 448A and increasing the length of portion 444A extending from the constriction of length 450B. As the length of portion 448A is pulled back through length 450B, length 450A releases the axial load on length 450B, returning it to an open or un-constricted state (having a larger inner diameter or cross-sectional area as compared to when length 450B is in a constricted state), better allowing portion 448B to be pulled back through length 450B. Exposed portion 452A facilitates lengthening of portion 444A and widening of the closable circumference 34 of waist portion 22. The constricting and release of the closing system 430 can be formed on one or both sides of garment 420 to achieve the desired tightening and/or loosening of the waist portion 22.

Line 440B is similar to line 440A. Line 440B comprises portions 442B, 444B, 446B and 448B. Portion 442B comprise an end portion of line 440B secured to waist portion 22. In one implementation, portion 442B is stitched to waist portion 22. In another implementation, portion 442B is welded, bonded or otherwise secured to waist portion 22.

Portion 444B of line 440B extends from portion 442B within sleeve 36 and further extends substantially about the entire circumference 34 of waist portion 22. In the example illustrated, portion 444B comprises the constrict-able tubular length 450B (noted above) and an exposed portion 452B. Constrict-able tubular length 450B comprises a length of line 440B which is in the form of a hollow tube, and which constricts or narrows in diameter in response to axial loads placed upon the tube forming constrict-able length 450B. In one implementation, the entire length of line 440B is a constrict-able tube. For example, in one implementation, the entire length of line 440B comprises a braided tube of fibrous material such as nylon or polyester. In another implementation, the entire length of line 440B comprises a tube of a resiliently flexible material, such as a resiliently flexible or stretchable elastic material or rubber-like material. In other implementations, constrict-able tubular length 450B may comprise a shorter or longer portion of line 440B, wherein other portions of line 440B are not tubular or are not constrict-able.

Portion 446B comprises that portion of line 440B that is extending through the hollow interior of constrict-able tubular length 450A, entering at entry 454B and exiting at exit 456B. Portion 448B comprises that portion of line 440B that extends from exit 456B and from length 450A. Portion 448B provides a segment of line 440B by which a person may grasp and pull line 440B to adjust a length of line 440B that extends from portion 442B, about the waist of the person wearing garment 420, and to the constriction of length 450A. In the example illustrated, portion 448B is secured to waist portion 22 at end portion 457B so as to not hang or dangle. In other implementations, portions 448B may comprise a loose, unattached end.

Exposed portion 452B comprises a segment of portion 444B of line 440B that is exposed inside of waist portion 22 and sleeve 36 such that a person may grasp portion 452B to pull back portion 448B through length 450A (as indicated by arrow 458B), shortening the length of portion 448B and increasing the length of portion 444B extending from the constriction of length 450A. As the length of portion 448B is pulled back through length 450A, length 450B releases the axial load on length 450A, returning it to an open or un-constricted state (having a larger inner diameter or cross-sectional area as compared to when length 450A is in a constricted state), better allowing portion 448B to be pulled back through length 450A. Exposed portion 452B facilitates lengthening of portion 444B and widening of the closable circumference 34 of waist portion 22.

In the example illustrated, sleeve portion 36 and waist portion 22 comprise openings 464A, 464B, 466A, 466B, 468A, 468B and 470A, 470B (collectively referred to as openings 464, 466, 468 and 470, respectively). In one implementation, each of openings 464, 466, 468 and 470 may be defined or protected by a grommet or other lining. Each of openings 464 and 466 comprises an opening from which portion 444A, 444B exits sleeve 36 and waist portion 22. Each of openings 466 comprises an opening into which portion 444A, 444B reenters sleeve 36 and waist portion 22. Openings 446 facilitate the provision of exposed portions 452A, 452B, allowing lines 444A, 444B, respectively, to be loosened when the size of waist portion 22 is to be increased. Each of openings 468 comprises an opening in sleeve 36 and waist portion 22 through which portion 448A, 448B exits, facilitating grasping of portion 448A, 448B when waist portion 22 is to be constricted, closed or reduced in size. Each of openings 470 allows the option for end portions 457A, 457B of portions 448A, 448B, respectively, to extend back into waist portion 22 for securement to waist portion 22. In other implementations in which end portions 457 of portions 448 is unattached, opening 470 may facilitate stowing of the unattached end portion.

When a person wishes to reduce or constrict the size of closable circumference 34 of waist portion 22, the person may pull on both portions 448. For example, the person may pull portion 448A through length 450B (as indicated by arrow 360A), increasing the length of portion 448A and reducing the length of portion 444A extending about waist portion 22 and back to portion 442A. The person may simultaneously pull portion 448B through length 450A (as indicated by arrow 360B), increasing the length of portion 448B and reducing the length of portion 444B extending about waist portion 22 and back to portion 442A. After the length of portions 444A, 444B and the size of the closable circumference of waist portion 22 have been established, the constriction of portions 450A and 450B retains the chosen size of the closable circumference of waist portion 22. Outward forces exerted upon waist portion 22 and upon line portions 444A, 444B of lines 440A, 440B place an axial load on lengths 450A, 450B which constricts about and against portions 446A, 446B, respectively. The constriction of portions 450 about portions 446 frictionally locks portions 450 to portions 446 about the entire circumference or in all sides of portions 446, inhibiting axial sliding movement of portions 446 within the hollow interior of constrict-able tubular lengths 450.

Figure 6B:
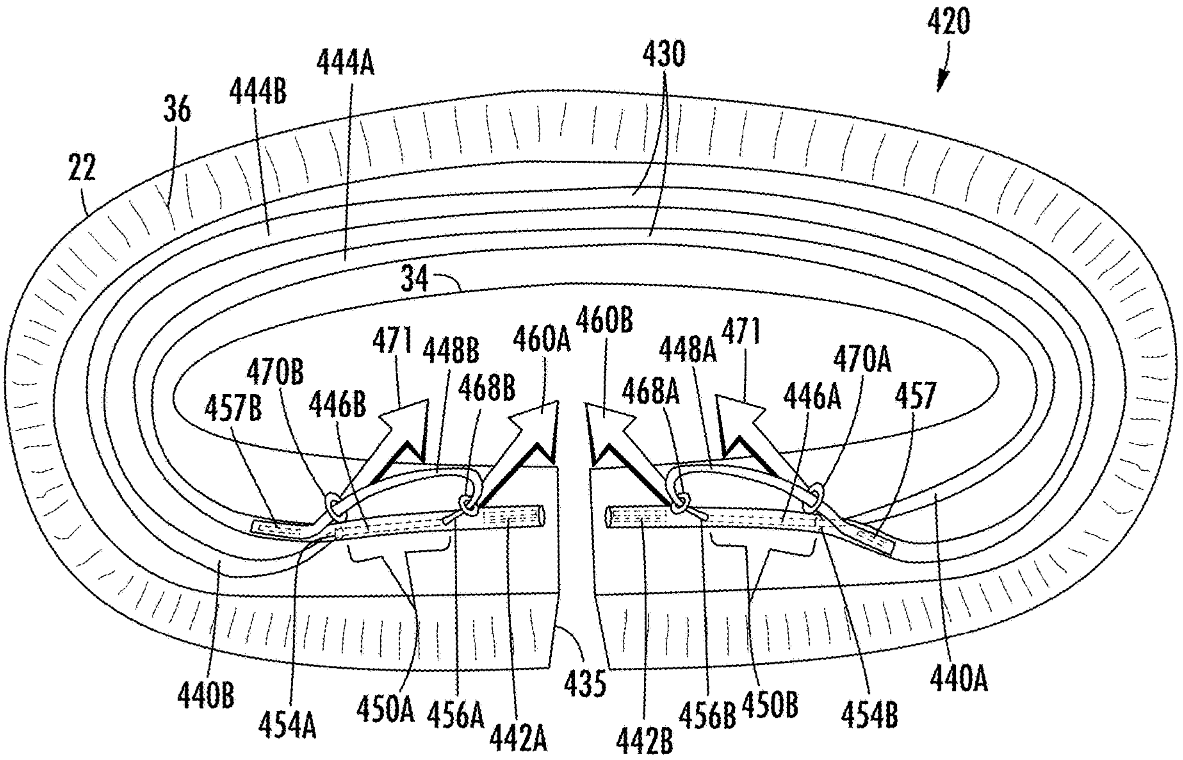

Referring to FIG. 6*b*, in another implementation, the circumference closing system 420 can be applied to a garment 420 having a separation or break 435 between the portions 442A and B. The separation or break 435 can be a fly of a pant, a full separating jacket hem or other separation.

Referring to FIGS. 6*a* and 6*b*, when a person wishes to reduce or constrict the size of closable circumference 34 of waist portion 22, the person may pull portions 448A and B through lengths 450A and B (as indicated by arrows 460A and B), increasing the length of portions 448A and B. After the desired lengths of portions 444A and B and the size of the closable circumference of waist portion 22, have been established, the constriction of portions 450A and B retain the selected size of the closable circumference of waist portion 22. Outward forces exerted upon waist portion 22 and upon line portions 444A and/or B place an axial load on lengths 450A and B which constricts about and against portion 446B and A, respectively. The constriction of portions 450A and B about portions 446B and A, respectively, frictionally locks portion 450A and B to portions 446B and A, respectively, about the entire circumference or on all sides of portions 446 A and B, inhibiting axial sliding movement of portion 446 B and A within the hollow interior of constrict-able tubular length 450A and B, respectively.

In FIG. 6*b*, by grasping portions 448A and 448B, and applying force in direction 471 toward 442A and B, a person can take the axial load off of portions 450B and A, respectively, reducing the constriction on portions 446A and B and lengthening portions 444A and B, which increases the total circumference of waist opening 430. One would do this on both sides to achieve the maximum circumference, but this could be performed on one side alone for partial effect.

Figure 6C:
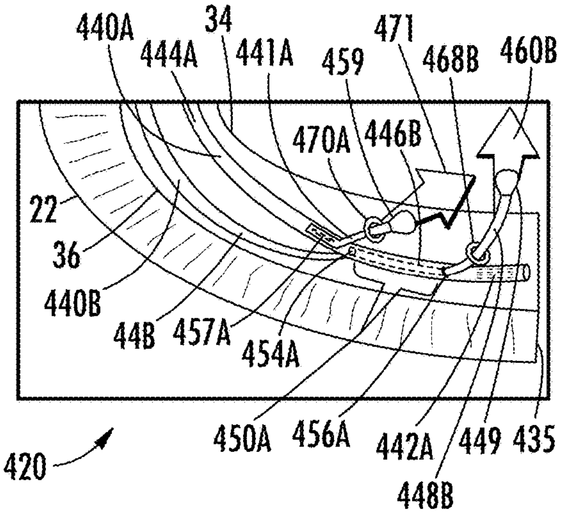

Referring to FIG. 6*c* in one implementation, portion 441A passes through opening 470A allowing end portion 457A of portion 444A for securement to waist portion 22. Portion 441A can include a graspable end 459. Similarly, portion 448B can include a graspable end 449. When a person wishes to reduce or constrict the size of closable circumference 34 of waist portion 22 of the implementation of FIG. 6*c*, the person may pull portion 448B through length 450A (as indicated by arrow 460B), increasing the length of portion 448B extending from the constriction of length 450A and reducing the size of the circumference 34. When a person wishes to increase the size of closable circumference 34 of waist portion 22 of the implementation of FIG. 6*c*, a person can grasp end portion 441A apply force in direction 471 toward portion 442A, which takes the axial load off of portion 450A, reduces the constriction on portion 446B, and lengthens portion 444B which increases the total circumference of waist opening 34. One would do this on both sides to achieve the maximum circumference, but this could be performed on one side alone for partial effect.

Figure 6D:
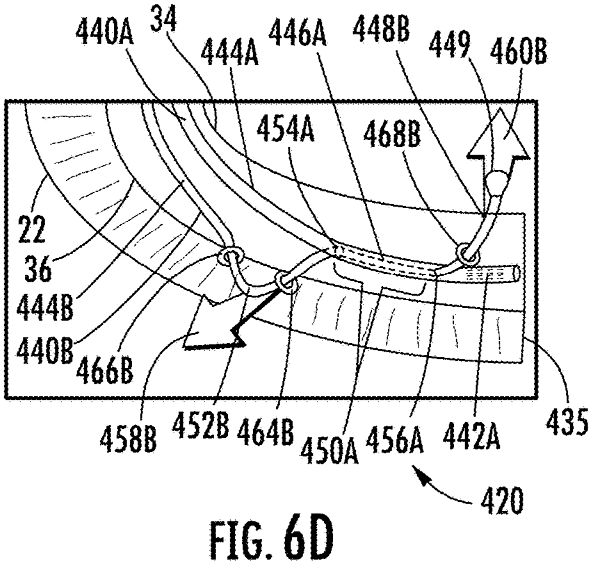

Referring to FIG. 6*d*, another implementation of the present invention is illustrated with portion 452B providing access for a person to increase the size of closable circumference 34 of waist portion 22 and includes portion 448B as an end portion. When a person wishes to reduce or constrict the size of closable circumference 34 of waist portion 22 of the implementation of FIG. 6*d*, the person may pull end portion 448B through length 450A (as indicated by arrow 460B), increasing the length of portion 448B extending from the constriction of length 450A thereby reducing the length of 444B. When a person wishes to increase the size of closable circumference 34 of waist portion 22 of the implementation of FIG. 6*d*, a person can grasp portion 452B apply force in direction of arrow 458B, which takes the axial load off of portion 450A, reduces the constriction on portion 446B, and lengthens portion 444B which increases the total circumference of waist opening 34. One would do this on both sides to achieve the maximum circumference, but this could be performed on one side alone for partial effect.

As shown by FIGS. 6*a* through 6*d*, circumference closing system 430 provides garment 420 with a user selectable waist portion circumference or size that is reliably retained. Circumference closing system 430 provides garment 420 with an easily adjustable waist portion 22 without requiring the use of a belt, clasps, buttons, buckles, fasteners and the like which might otherwise add undesirable amounts of weight, bulk and/or complexity to the closing system and/or limit movement or flexibility of garment 420. Although circumference closing system 430 is illustrated as being part of pants 20, circumference closing system 430 may be used in other pieces of apparel or other garments.

FIGS. 7-12 illustrate another example garment 520 comprising a circumference closing system 530. The example is similar to the implementation of FIG. 6*d*. In the example illustrated, garment 520 comprises a pair of pants or shorts having split circumference 534 (separated at a zipper region or split 535), wherein opposite sides of the split 535 are secured to one another by a clasp or hook 537. In other implementations, split 535 may be omitted. In other implementations, garment 520 may comprise an alternative piece of apparel or garment, such as a skirt or a jacket.

Figure 9:
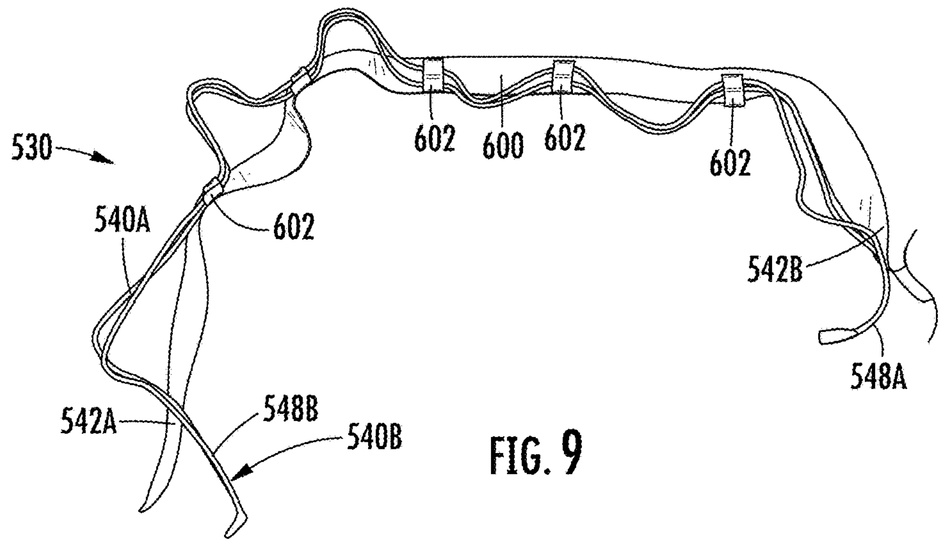
FIG. 9 is a top perspective view of the example circumference closing system separated from a remainder of the garment.

FIGS. 9-12 illustrate circumference closing system 530 in more detail, separated and removed from the remainder of garment 520. As shown by FIG. 9, circumference closing system 530 comprises band 600, guides 602, and lines 540A, 540B (collectively referred to as lines 540). Band 600, guide 602 and lines 540 are substantially contained within the interior of sleeve 536 along waist portion 522.

Band 600 comprises an elongate strap or webbing that extends within sleeve 536 about the circumference 534 of waist portion 522. Band 600 as opposite ends affixed to clasp 537, joining opposite sides of waist portion 522 to form an endless circumference. In the example illustrated, band 600 comprises a strap of elastic material such as polyester or other elastomeric material. The elastic nature of band 600 provide some degree of accommodation for different waist sizes. Moreover, the elastic nature of band 600 distributes loads of lines 540A and B along band 600. In other implementations, band 600 may be inelastic. In yet other implementations, band 600 may be omitted, where lines 540 are contained within sleeve 36 or extend on the exterior waist portion 522.

Figure 10:
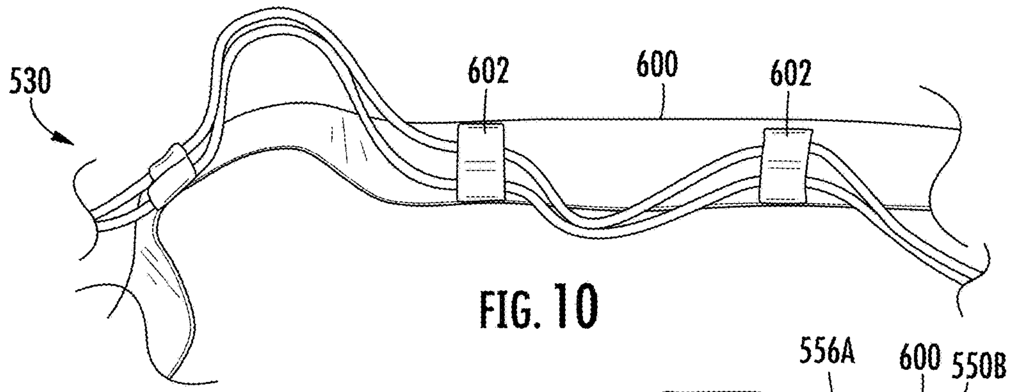
FIG. 10 is an enlarged view of a portion of the circumference closing system of FIG. 9.

As shown by FIG. 10, guides 602 comprise channels provided at spaced locations along the length of band 600. Guides 602 provide control passages through which lines 540 pass. Guides 602 maintain lines 540 in close proximity and opposite to band 600 such that changes in the "effective" length of lines 540 results in adjustment of the circumference of band 600 and the circumference 534 of waist portion 522. In other implementations, guide 602 may be omitted or of other configurations.

Line 540A comprises portions 542A, 544A, 546A, 548A and 550A. Portion 542A comprise an end portion of line 540A secured to band 600 in one implementation, portion 542A is stitched to band 600. In another implementation, portion 542A is welded, bonded or otherwise secured to band 600.

Figure 8:
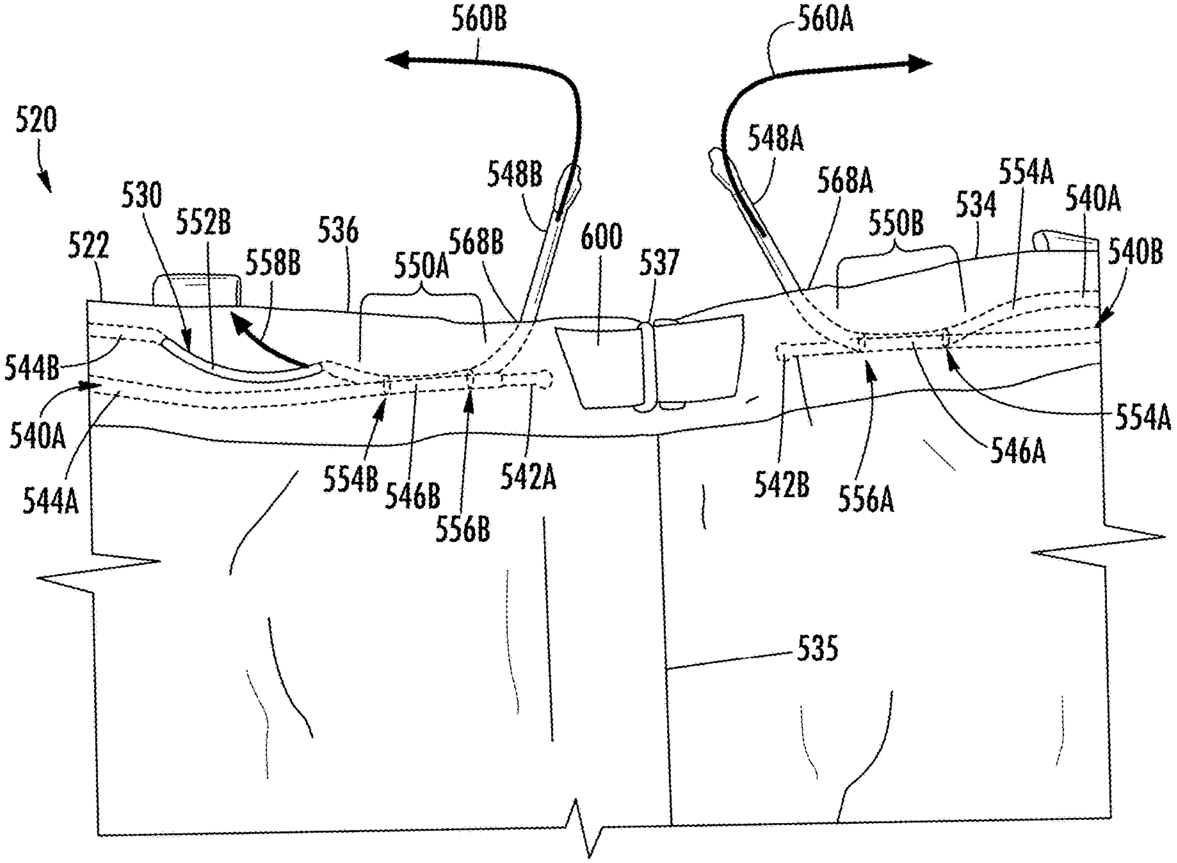
FIG. 8 is a fragmentary view of the portion of the example garment with portions transparently illustrated are shown in broken lines to further illustrate the example circumference closing system.

Portion 544A of line 540A extends from portion 542*a* along band 600, guided by guides 602, within sleeve 536 and further extends substantially about the entire circumference 534 of waist portion 522. In the example illustrated, portion 544A comprises a constrict-able tubular length 550A (shown in FIGS. 8 and 11) and an exposed portion 552A (FIG. 8). In the example illustrated, portion 544A comprises a constrict-able tubular length 550A. Constrict-able tubular length 550A comprises a length of line 540A which is in the form of a hollow tube, and which constricts or narrows in diameter in response to axial loads placed upon the tube forming constrict-able length 550A. In one implementation, the entire length of line 540A is a constrict-able tube. For example, in one implementation, the entire length of line 540A comprises a braided tube of material. In another implementation, the entire length of line 540A comprises a tube of a resiliently flexible material, such as a resiliently flexible or stretchable elastic material or rubber-like material. In other implementations, constrict-able tubular length 550A may comprise a portion of line 540A, wherein other portions of line 540A are not tubular or are not constrict-able.

Figure 11:
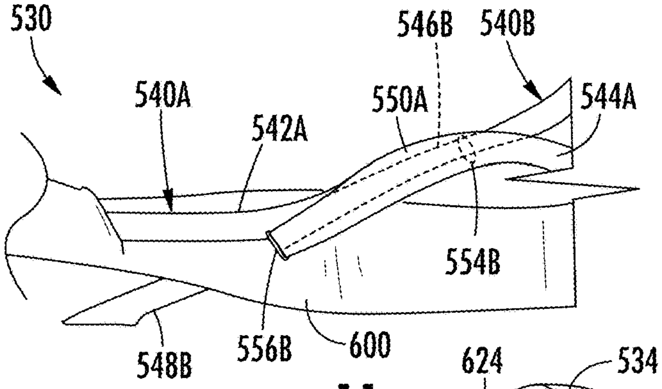
FIG. 11 is an enlarged view of another portion of the circumference closing system of FIG. 9.
Figure 12:
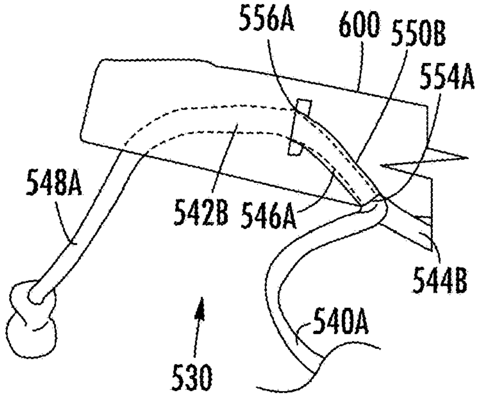
FIG. 12 is an enlarged view of another portion of the circumference closing system of FIG. 9.

Referring to FIGS. 11 and 12, portion 546A comprises that portion of line 540A that is extending through the hollow interior of constrict-able tubular length 550B, entering at entry 554 and exiting at exit 556A where line 540A passes through band 600, forming portion 548A. Portion 548A comprises that portion of line 540A that extends from exit 556A and from length 550B. Portion 548A provides a segment of line 540A by which a person may grasp and pull line 540A to adjust a length of line 540A that extends from portion 542A, about the waist of the person wearing garment 520, and to the constriction of length 550B. In the example illustrated, portion 548A comprises a loose, unattached end. In other implementations, portion 548A is secured to waist portion 522 so as to not hang or dangle, or to reattach portion 548A to portion 544 adjacent to entry 554 opposing length 550 in order to loosen.

Line 540B is similar to line 540A except that line 540B has portion 542B that has an exposed portion 552B (shown in FIG. 8). Those remaining components of line 540B which correspond to components of line 540A are numbered similarly but followed with a “B” designation rather than an “A” designation.

Exposed portion 552B comprises a segment of portion 544B of line 540A that is exposed inside of waist portion 522 and sleeve 536 such that a person may grasp portion 552B to pull back portion 548B through length 550A (as indicated by arrow 558B), shortening the length of portion 548B and increasing the length of portion 544B extending from the constriction of length 550A. As the length of portion 548B is pulled back through length 550A, tension on length 550B is reduced such that both of lengths 550A and 550B are in an open or un-constricted state (having a larger inner diameter or cross-sectional area as compared to when in a constricted state), better allowing portion 548A to be pulled back through length 550B when a load is applied at 537A. Exposed portion 552B facilitates the widening of the closable circumference 534 of waist portion 522.

Figure 7:
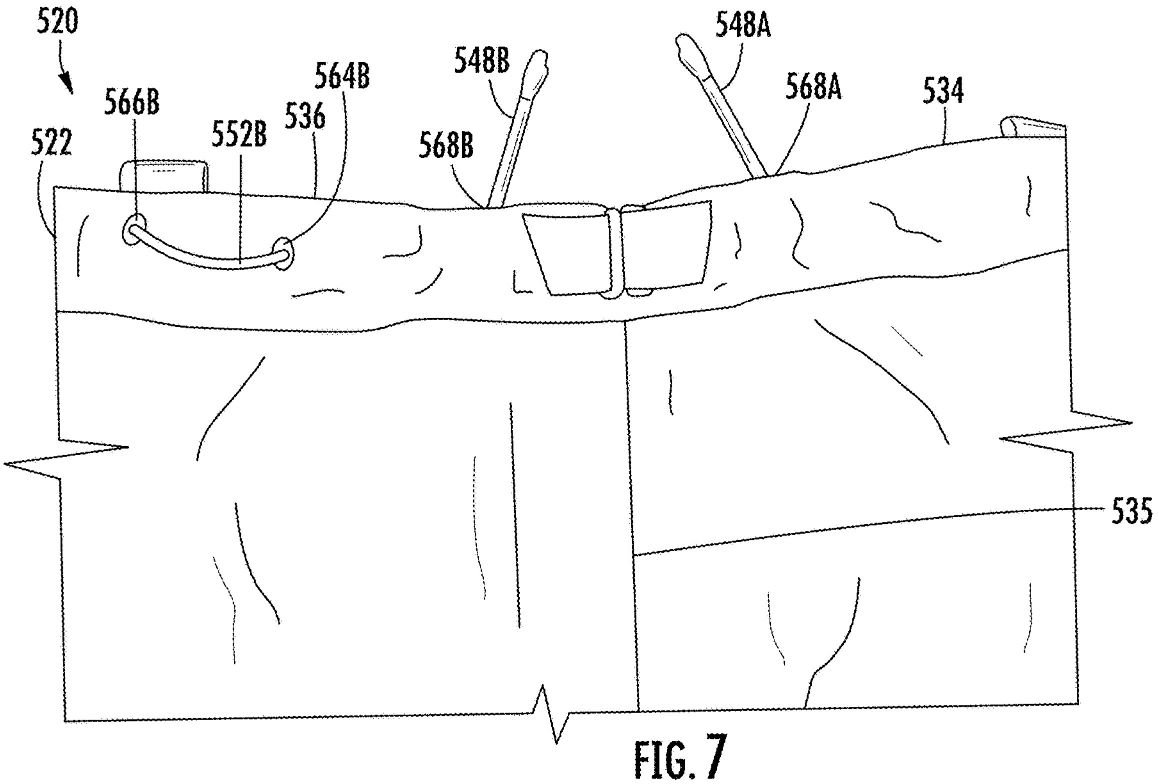
FIG. 7 is a fragmentary front view of a portion of another example garment incorporating another example circumference closing system.

In the example illustrated by FIGS. 7 and 8, sleeve portion 536 and waist portion 522 comprise openings 564A, 564B, 566A, 566B and 568A, 568B (collectively referred to as openings 564, 566 and 568, respectively). In one implementation, each of openings 564, 566 and 568 may be defined or protected by a grommet or other lining. Each of openings 564 comprises an opening from which portion 544A, 544B exits sleeve 536 and waist portion 522. Each of openings 566 comprises an opening into which portion 544A, 544B reenters sleeve 536 and waist portion 522. Openings 564 facilitate the provision of exposed portions 552A, 552B, allowing lines 544A, 544B, respectively, to be loosened when the size of waist portion 522 is to be increased. Each of openings 568 comprises an opening in sleeve 536 and waist portion 522 through which portion 548A, 548B exits, facilitating grasping of portion 548A, 548B when waist portion 522 is be constricted, closed or reduced in size.

When a person wishes to reduce or constrict the size of closable circumference 534 of waist portion 522, the person may pull both of portions 548. For example, the person may pull portion 548A through length 550B (as indicated by arrow 560A), increasing the length of portion 548A and reducing the length of portion 544A extending about waist portion 522 and back to portion 542A. The person may simultaneously pull portion 548B through length 550A (as indicated by arrow 560B), increasing the length of portion 548B and reducing the length of portion 544B extending about waist portion 522 and back to portion 542A. After the length of portions 544A, 544B and the size of the closable circumference of waist portion 522 have been established, the constriction of portions 550A and 550B retains the chosen size of the closable circumference of waist portion 522. Outward forces exerted upon waist portion 522 and upon line portions 544A, 544B of lines 540A, 540B place an axial load on lengths 550A, 550B which constricts about and against portions 546A, 546B, respectively. The constriction of portions 550 about portions 546 frictionally locks portions 550 to portions 546 about the entire circumference or on all sides of portions 546, inhibiting axial sliding movement of portions 546 within the hollow interior of constrict-able tubular lengths 550.

As shown by FIGS. 7 and 8, circumference closing system 430 provides garment 520 with a user selectable waist portion circumference or size that is reliably retained. Circumference closing system 530 provides garment 520 with an easily adjustable waist portion 522 without requiring the use of a belt, clasps, buttons, buckles, fasteners and the like which might otherwise add undesirable amounts of weight, bulk and/or complexity to the closing system and/or limit movement or flexibility of garment 520.

Although each of the circumference closing systems 30, 330, 430 and 530 have been described as being incorporated into waist portions of various garments such as pants, shorts and skirts, each of the above described circumference closing systems 30, 330, 430 and 530 may additionally be incorporated into various other articles that have an adjustable mouth or circumference. For example, each of the above described circumference closing systems 30, 330, 430 and 530 may additionally be incorporated into any closed-loop waistband or other article having a circumference to be closed down, such as a waist opening of a jacket, a leg opening of pants, a sleeve opening, a cuff, a hem or the like. In addition to garments such as running shorts, sweatpants, swim shorts, skirts, jackets and the like, such closing systems may be incorporated into bags such as, backpacks, equipment bags, stuff sacks, travel bags, sling bags and other bags having a mouth or opening which can be secured in a closed state, but is openable for the insertion of objects.

Figure 13:
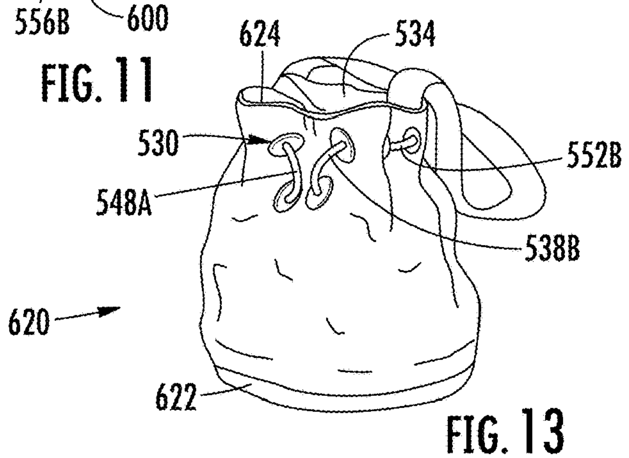
FIG. 13 is a perspective view of an example bag incorporating the example circumference closing system of FIG. 9.

FIG. 13 illustrates an example bag 620 incorporating circumference closing system 530 described above. Bag 620 comprises a floor 622 and a mouth 624 having a circumference 534 which may be selectively opened and closed or constricted through the actuation of circumference closing system 530 described above. In such an implementation, circumference closing system 530 retains mouth 624 in a securely closed state. At the same time, pulling of exposed portion 552B allows mouth 624 to be opened for the insertion or removal of articles.

Figure 14:
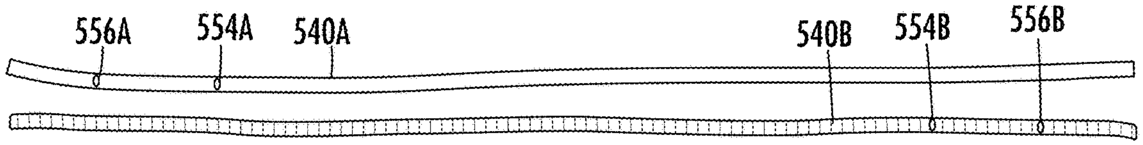
FIGS. 14-17 are front views illustrating an example method for forming a portion of the example circumference closing system of FIG. 9.
Figure 15:
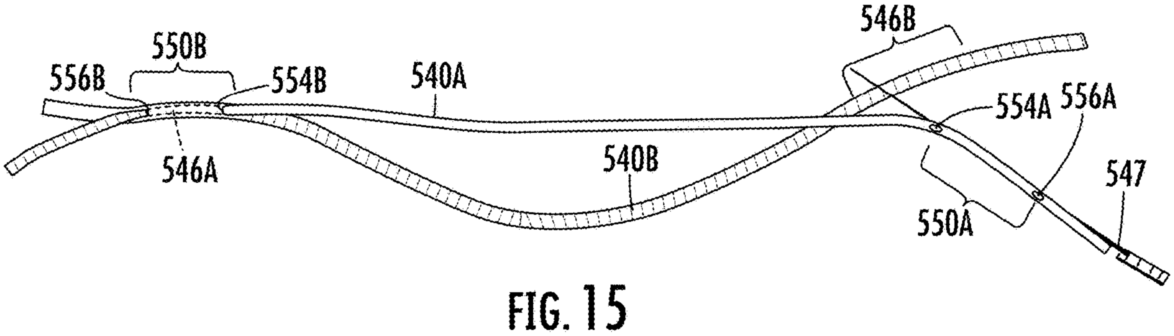

FIGS. 14-17 illustrate one example method for forming portions of circumference closing system 530. As illustrated by FIG. 14, two separate lines 540A and 540B are provided. As illustrated by FIG. 15, a portion of line 540B is passed through a constrict-able tubular portion 550A of line 540A. Likewise, a portion of line 540A is passed through a constrict-able tubular portion 550B of line 540B. As shown by FIG. 15, in one implementation, the passing through of one line through to the interior portion of another line may be carried out using a tool 547.

Figure 16:
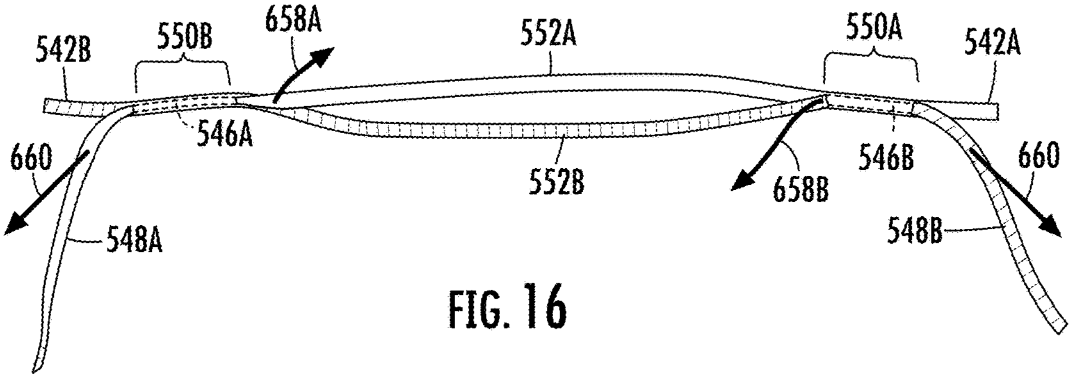
Figure 17:
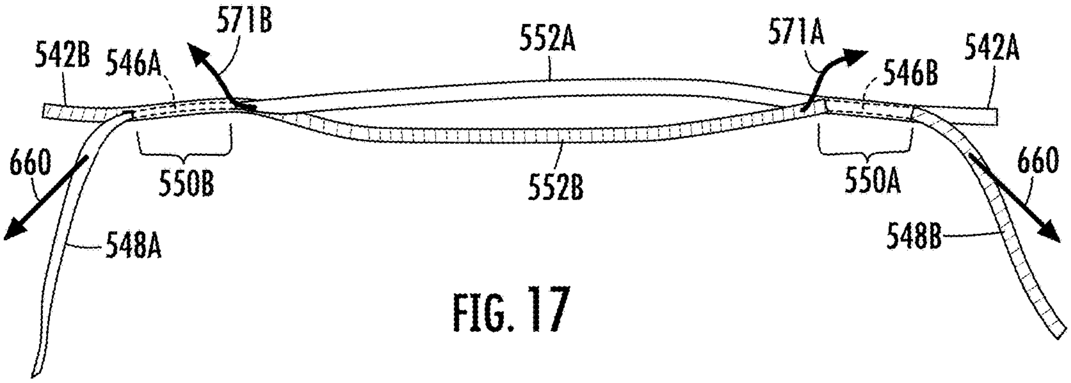

As illustrated by FIGS. 16 and 17, end portions 542A and 542B are subsequently secured to the garment or other article through stitching or the like, directly or indirectly such as being attached to a band, such as band 600. As described above, the remaining portions of lines 540A and 540B may be contained within the sleeve of the garment or article, wherein at least one portion 552A and/or 552B is exposed to allow portions 552A and/or 552B to be pulled as indicated by arrows 658A and B, facilitating opening or enlarging the circumference. Portions 548 may be grasped and pulled in the direction indicated by arrows 660 to constrict or close the circumference of the garment or article.

Figure 18:
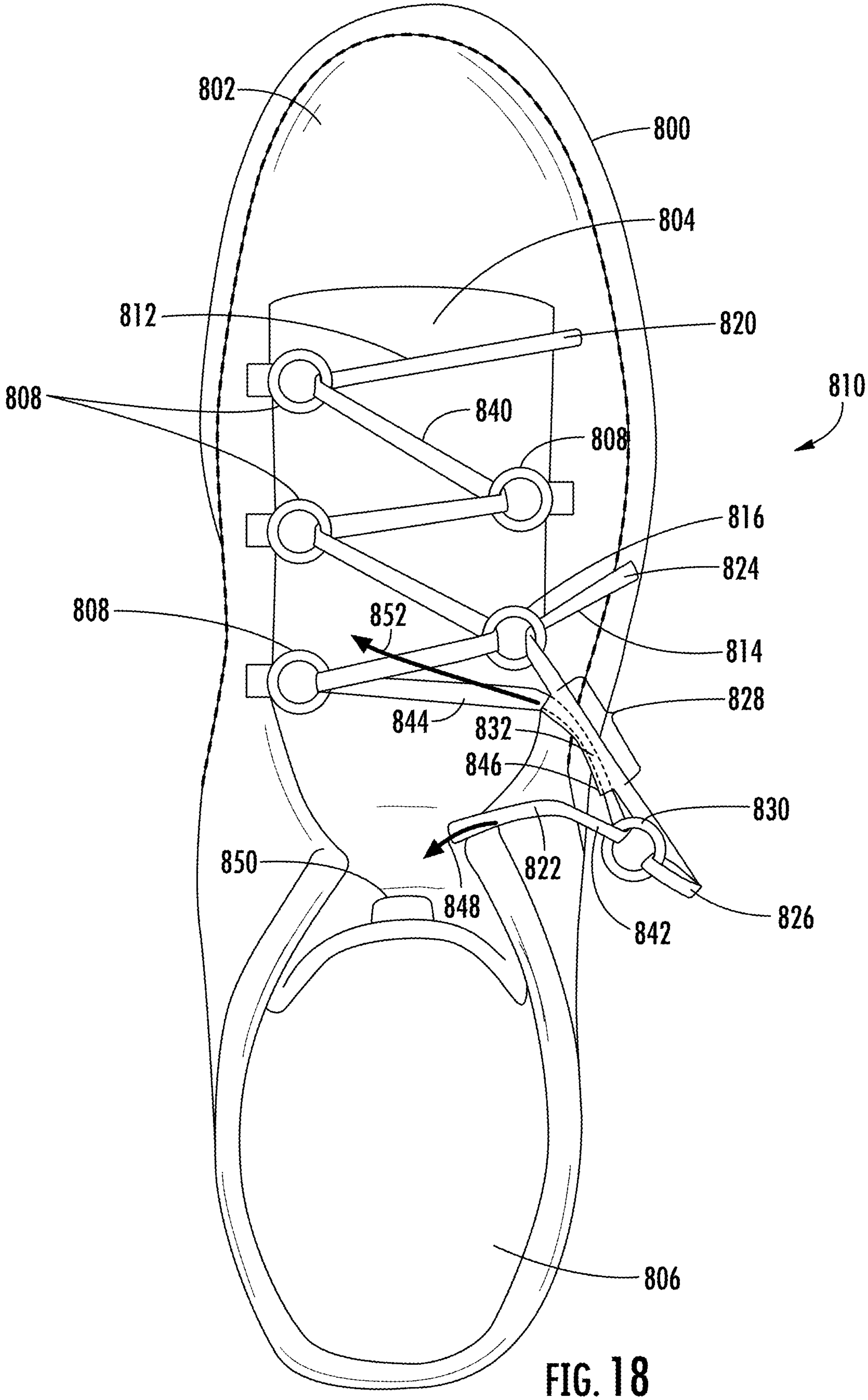
FIG. 18 is a top view of an article of footwear incorporating an example implementation of a footwear closing system.
Figure 19:
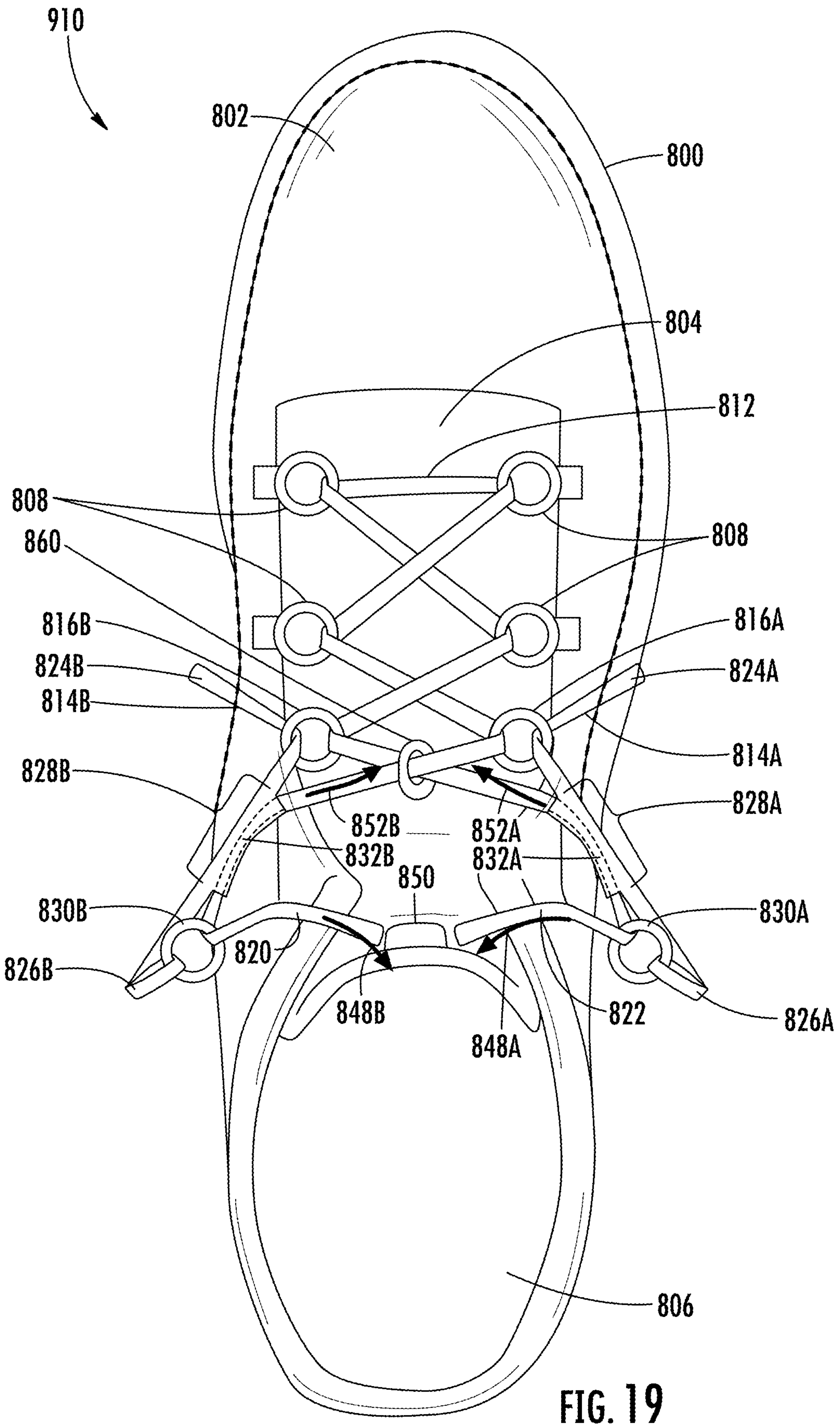
FIGS. 19 and 20 are top views of articles of footwear incorporating other example implementations of footwear closing systems.
Figure 20:
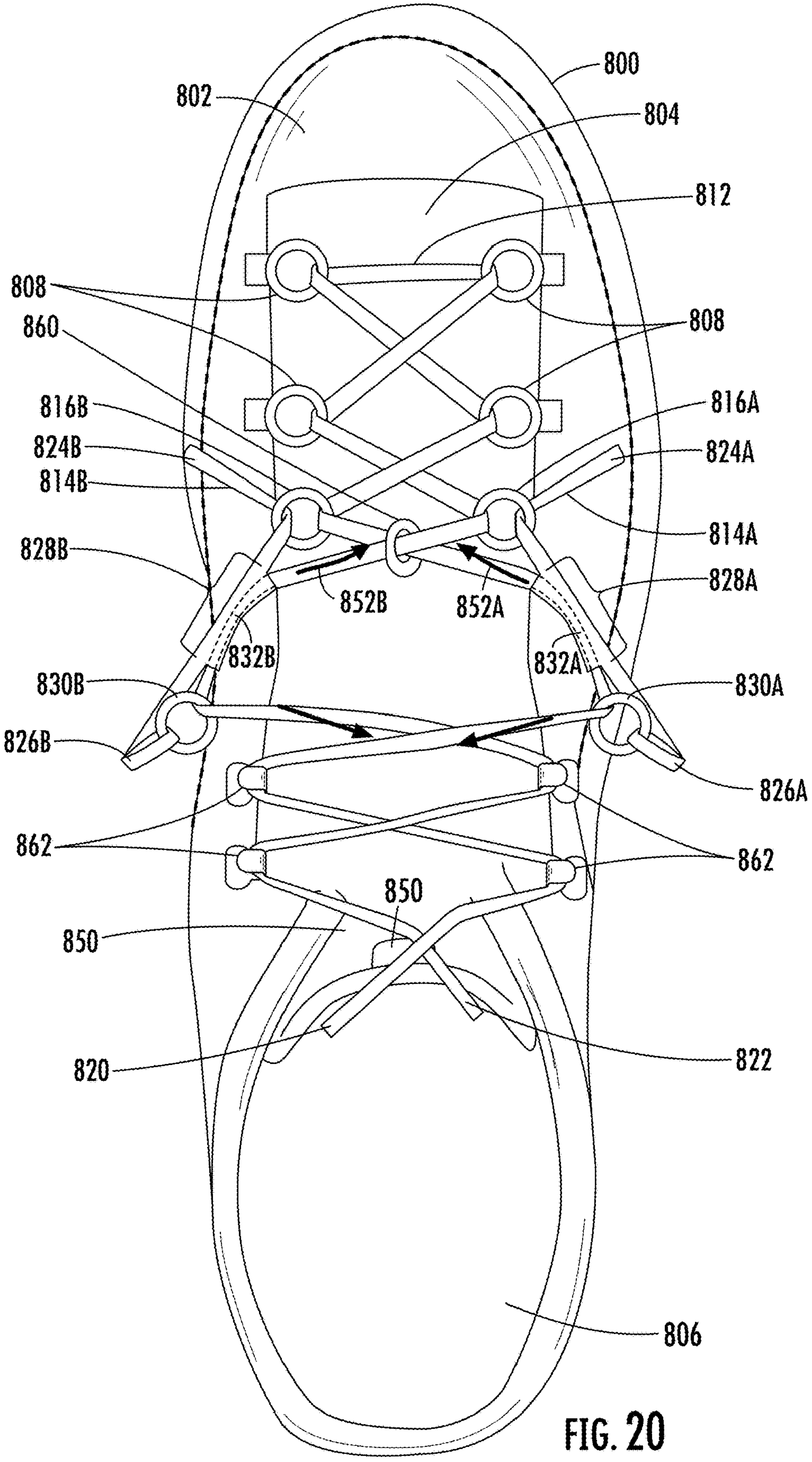

Referring to FIG. 18 through 20, example implementations of the present invention applied to an article of footwear 800 are illustrated. The article of footwear 800 can be a shoe, a sandal, a boot or any type of footwear. The article 800 of footwear includes an upper 802 and a tongue 804 defining an opening 806 for receiving the foot of a user, and a plurality of fixed eyelets 808 for routing of a lacing assembly 810. The eyelets 808 are fixedly coupled to the upper 802 in a spaced apart manner about the perimeter of the opening 806. In other implementations, the article of footwear can be formed without a tongue. In other implementations, the article of footwear can be formed with other structure or structures for securing the lacing such as, for example, one or more openings, one or more movable eyelets, one or more flexible eyelets, one or more anchors, one or more hooks, one or more latches and combinations thereof.

The lacing assembly 810 includes a first lace 812, a cord 814 and a floating eyelet 816. The first lace 812 is an elongate flexible cord or line such as a lacing applied to existing footwear articles. The first lace 812 has a first lace end 820 coupled to the upper 802 and a second lace end 822. The cord 814 can be a generally circular braided elongate member including first and second cord ends 824 and 826 and a constricting tube 828 positioned between the first and second cord ends 824 and 826. The constricting tube 828 can be a braided cord having hollow interior between first and second constricted tube openings 844 and 846. In other implementations, the cord and the constricted tube can have other constructions. The first lace end 820 is fixedly coupled to the upper 802, such as, through a stitching. In other implementations, the first lace end 820 can be fixedly coupled to the upper 802 in other manners. The second lace end 822 is then routed through a plurality of the fixed eyelets 808, the floating eyelet 816, another one of the eyelets 808, the constricting tube 828 and an upper fixed eyelet 830 where the second lace end 822 is then available for grasping and pulling by the user. In other implementations, other numbers of eyelets or other fasteners can be used, the order or positioning of the eyelets (fixed and/or movable) and the constricting tube can be varied. The first cord end 824 is fixedly coupled to the upper 802 such as through a stitching. In other implementations, other means for fixing the first cord end to the upper can be used. The second cord end 826 is routed through the floating eyelet 816 and is anchored to the upper 802 and is looped through the upper fixed eyelet 830. In other implementations, the cord 814 can take alternate paths through one or more eyelets or other fasteners and can be arranged between, before or after the constricting tube.

The portion of the first lace 812 extending through the constricting tube 828 is referred to as a lockdown portion 832. The portion of the first lace 812 between the first lace end 820 and the constricting tube 828 is referred to as a first lace portion 840, and the portion of the first lace 812 extending between the constricting tube 828 and the second lace end 822 is the second lace portion 842. The second lace portion 842 is an adjustable end portion of the first lace 812 in that its length is adjustable based upon which direction the first lace 812 is pulled through the constricting tube 828 by the user.

The lacing assembly 810 provides a durable, reliable lacing for articles of footwear without requiring the use of one or more knots, or one or more fasteners or other hardware. The lacing assembly 810 uses the application of an axial load onto the braided cord 814 when the first lace 812 is tightened. The axial load is accomplished by fixing the first cord end 824 to a first location on the upper 802, routing the cord 814 through the floating eyelet 816, and then fixing the second cord 826 at a second location of the upper 802 typically closer to an upper portion of the shoe opening 806. The first lace 812 can follow a traditional lacing path from the first lace end 820 fixed to the upper 802 to the floating eyelet 816, where the lace 812 extends to another of the eyelets 808 before entering the constricting tube 828 through the first opening 844. The first lace 812 extends through the constricting tube 828 and exits the tube 828 at the second opening 846 where it extends through the upper fixed eyelet 830. The orientation of the upper fixed eyelet 830 near or in line with the second opening 846 of the constricting tube 828 protects the second opening 846 of the constricting tube 828 from damage, wear or pulling out from pulling the second portion 842 of the first lace 812.

The lacing assembly 810 is then tightened by pulling on the second lace portion 842 of the first lace 812 (such as in the direction of arrow 848). The pulling increases the load on the fixed upper eyelet 830 and the floating eyelet 816 creating an axial load on the braided cord 814 at the constricting tube 828 which causes the constricting tube to constrict, draw down or lock down onto the lockdown portion 832 of the lace 812 extending through the constricting tube 828. The constricting, clamping or locking down of the constricting tube 828 of the cord 814 onto the lockdown portion 832 provides a secure fixed clamp or lock of the lace 812 with the cord 814 securing the lace 812 in place and keeping the article of footwear 800 securely on the user's foot. In one implementation, the article of footwear 800 may include a pouch 850 or pocket for storing the free second end 822 of the lace 812 after the lace system 810 has been tightened by pulling on the second portion 842 of the lace 812.

The lacing system 810 can be loosened by pulling on the first lace portion 840 (such as in the direction of arrow 852). Pulling of the first portion 840 of the first lace 812 reduces the axial load on the constricting tube 828 thereby releasing or lessening of the constriction, clamping or locking-down of the portion 832 of the first lace 812 within the constricting tube 828 enabling the lace 812 to move relative to the constricting tube 828.

Referring to FIG. 19, lacing system 910 is illustrated. The lacing system 910 is another implementation of the present invention and is substantially similar to the lacing system 810 except that lacing system 910 includes first and second cords 814A and 814B positioned on opposite sides of the opening 806 on the upper 802, first and second floating eyelets 816A and 816B, and first and second upper eyelets 830A and 830B. Additionally, rather than being fixed to the upper as in system 810, the first lace end 820 is not fixed or anchored to the upper, but it is routed through the eyelets 808, the second constricting tube 828B and the second upper eyelet 830B to form a first adjustable end 820. Accordingly, the lacing system 910 provides first and second adjustable ends 820 and 822, which can be selectively positioned within the pocket 850.

The lacing system 910 is a double locking system due to the first and second constricting tubes 828A and 828B. The lacing system 910 can be tightened by pulling the first and second lace ends 820 and 822, such as in the directions of 848A and 848B. Pulling on lace ends 820 and 822 increases the axial load or tension on the constricting tubes 828A and 828B causing the constricting tubes 828A and 828B to clamp down, constrict or lock down on to the portions 832A and 832B, respectively, of the lace 812. In order to loosen the lacing system 910, a user can pull the portion of the lace 812 between the first and second constricting tubes 828A and 828B. The lace system 910 can further include a loosening ring 860 to facilitate the grasping and pulling of the lace 812 from the through the first openings 844A and 844B of the constricting tubes 828A and 828B. In other implementations, the loosening ring can take other shapes or configuration such as including a tab for facilitating the grasping of the loosening ring. The lacing system 910 provides a tight secure closure or tightening of the article of footwear 800 about the user's foot.

FIG. 20 illustrates another implementation of the present invention. In particular, lacing system 1010 is illustrated. Lacing system 1010 is similar to lacing system 910 except that the lace 812 can be longer and the article of footwear 800 can be taller extending over more of the user's foot such as a boot or high top casual shoe. The article of footwear 800 can include a plurality of hooks 862 for facilitating the lacing of the lace 812 about the upper portion of the article of footwear 800. In other implementations, other fastening mechanisms can be used to secure the lacing through the upper portion of the footwear article, such as, for example, eyelets, openings, loops, other fasteners, and combinations thereof.

Figure 21:
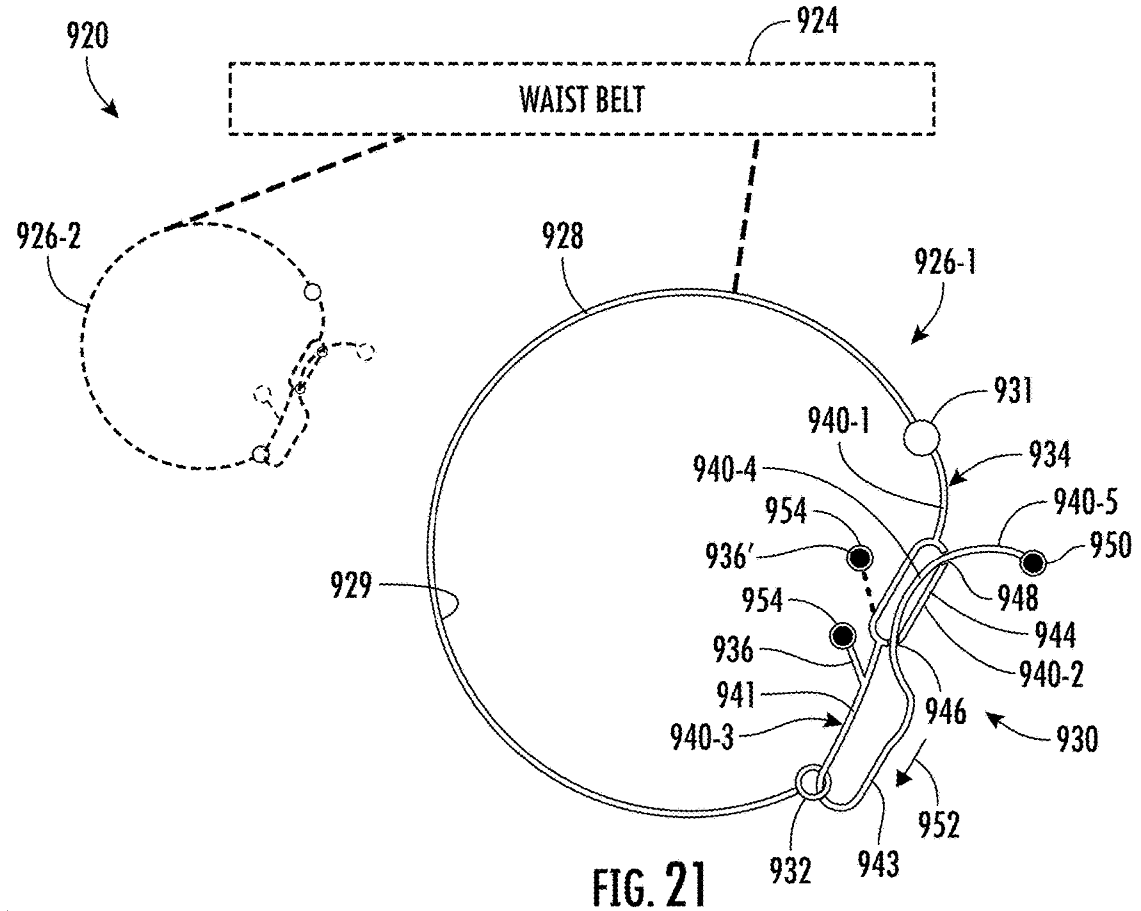
FIG. 21 is a diagram schematically illustrating portions of an example harness with an example leg loop having an example circumference closing system.

FIG. 21 schematically illustrates portions of an example harness leg loop 926-1 which may be used as part of a larger harness 920 which additionally comprises a waist belt 924 and another harness leg loop 926-2 (both of which are shown in broken lines). Waist belt 924 comprises a band or belt (sometimes referred to as a swami) configured to be wrapped and secured about the waist of a person wearing harness 920. Each of harness leg loops 926-1 and 926-2 (collectively referred to as loops 926) is configured to extend about and receive a thigh of the person wearing harness 920. In some implementations, each of harness leg loop 926 are releasably connected to waist belt 924. In yet other implementations are fixedly joined to or are integrally formed as part of waist belt 924.

Each of leg loops 926 comprises a circumference closing system 930, providing an adjustable leg receiving opening 929. Each of leg loops 926 comprises a flexible perimeter 928 defining a closable circumference about opening 929, the flexible perimeter having a first end portion 931 and a second end portion 932. The flexible perimeter 928 may be in the form of a strap, band or other member configured to wrap about the thigh of a person. In some implementations, the flexible perimeter 928 has a uniform width along its length. In other implementations, the flexible perimeter 928 may have a varying width along its length.

Each of leg loops 926 further comprises a single continuous line 934 and a tension release 936 which form the circumference closing system 930. For purposes of this disclosure, single continuous line refers to a single elongate member having a first end and a second end. The single elongate member may be composed of one elongated member continuously extending from the first end to the second end without interruption or may comprise multiple segments joined end to end or joined to one another in an overlapping fashion between the first end and the second end. The single elongate member may be in the form of a rope, a cord, a strap, a band or the like. The single elongate member may be formed from a fabric or may be formed from one or more polymers. The single elongate member may be solid, woven, braided or wound.

The single continuous line 934 comprises a first length 940-1, a second length 940-2, a third length 940-3, the fourth length 940-4 and a fifth length 940-5. For purposes of this disclosure, a "length" refers to a portion of the single continuous line between the first end and the second end of the single continuous line. In the example illustrated, the first length 940-1 is fixed to the first end portion 931. Fixed means that the first length is not removably connected to the first end portion; the first length may not be separated from the first end portion without breaking a connection, such as breaking an adhesive bond or weld, or severing stitching, or without damaging either or both of the first length 940-1 or the first end portion 931. In some implementations, the first length 940-1 may be releasably connected to the first end portion 931, such as with a hook, buckle or the like.

The second length 940-2 extends between the first length 940-1 and the third length 940-3 the second length 940-2 comprises a constricting tube configured to radially constrict in response end of the tube being placed in tension (pulled in opposite directions or a first and being held in place while the second end is pulled away from the first end). In some implementations, the constricting tube is provided along a discrete portion of the single continuous line 934. In other implementations, the single continuous line 934 may be in the form of a tube extending along an entirety of the length of line 934, from its first end to its second end. In some implementations, the constricting tube comprises an elastic braided tube or an elastic woven tube. In some implementations, the constricting tube may be formed from a nonwoven or non-braided (solid) tube formed from an elastic polymer, rubber or rubber-like material.

The third length 940-3 is coupled to the second length 940-2 such that pulling of the third length 940-3 in a direction away from the first length 940-1 results in constricting tube 940-2 being placed in tension and constricting. The third length 940-3 has a first portion 941 extending away from the constricting tube 944 towards the second end portion 932 and a second portion 943 that is doubled back, extending back towards the constricting tube 944. The third length is slidably coupled to the second end portion 932 of flexible perimeter 928 and doubles back to the constricting tube 944 of the second length 940-2. The term "slidably coupled" with respect to the second end portion 932 means that the third length is either directly connected to the second end portion and is slidable relative to the second end portion as it doubles back. The term "slidably coupled" may also mean that the third length is slidably connected to an intermediate member (such as a buckle), slidable relative to the intermediate member before doubling back, wherein the intermediate member is itself directly or indirectly connected to the second end portion 932. Because the third length 940-3 is slidably coupled to the second end portion as it doubles back towards the constricting tube 944, the third length 940-3 may be pulled or released to adjust the total effective spacing or distance between the second end portion 932 and constricting tube 944, adjusting the internal diameter or size of opening 929.

In the example illustrated, the third length 940-3 is coupled in a manner that the third length 940-3 slidably loops back on itself while extending between the second end portion 932 and the second length 940-2. In one implementation, the second end portion 932 may comprise a loop or eyelet through which the third length 940-3 slidably passes and doubles back. In yet another implementation, the third length 940-3 slidably passed through a bar of a buckle before doubling back on itself towards a second length (the constricting tube 944), wherein the buckle is captured within an eyelet provided at the second end portion 932. In still other implementations, the second end portion 932 may comprise a buckle, bar or the like, wherein the third length 940-3 wraps around the buckle, bar or the like and turns back or doubles back on itself towards the constricting tube 944.

Fourth length 940-4 comprises that portion of line 934 that currently resides within constricting tube 944, entering constricting tube 944 through an inlet 946 proximate an end of tube 944 closest to the second end portion 932 and exiting constricting tube 944 through an outlet 948 proximate an end of tube 944 closest to first end portion 931. The particular actual portion of line 934 currently residing in constricting tube 944 may vary depending upon the current size of opening 929 chosen by the person wearing harness 920. Length 940-4 is configured to slide within tube 944 and to be gripped by the interior of tube 944 when tube 944 is placed in sufficient tension (when at least one of the ends of tube 944 is being pulled away from the other of the ends of tube 944).

Fifth length 940-5 extends from portion 940-4 beyond outlet 948. In the example illustrated, fifth length 940-5 terminates at a head 950 shaped or size so as to not be passable through outlet 948. Head 950 inhibits the complete retraction of line 934 into constricting tube 944 or even out of constricting tube 944. In some implementations, head 950 further fight a handle or gripping surface for a person to grasp line 934 to pull line 934 in a direction towards the first end portion 931. Such pulling may increase the length of fifth length 940-5 and may reduce the length of third length 940-3, further reducing the size of thigh opening 929. Manual release of length 940-5 results in end portions 931 and 932 attempting or tending to move apart or away from one another to a less constricted state, exerting forces upon constricting tube 940-2 in opposite directions. This results in constricting tube 944 being placed in greater tension and results in constricting tube 944 constricting, gripping and resisting sliding movement of fourth length 940-4 out of constricting tube 944, maintaining the spacing between second and portion 932 and constricting tube 944 and retaining the selected size for thigh opening 929.

Tension release 936 comprises a structure by which a person may temporarily reduce the degree or amount of tension of constricting tube 944. Reducing the tension of tube 944 permits tube 944 to resiliently shorten while enlarging or expanding to a greater interior diameter or size. The greater interior diameter or size of tube 944 reduces the grip on length 940-4, permitting length 940-4 to slide out of tube 944 through entry 946 and through outlet 948 in the direction indicated by arrow 952. As a result, the spacing between second end portion 932 and constricting tube 944 (and first end portion 931) is increased, increasing the size of thigh opening 929. Upon release of tension release 936, constriction tube 944 may once again return to an in-tension state in which tube 944 once again grips the currently received length 940-4 to restrict or inhibit further release of length 940-4 from tube 944 towards second end portion 932 to inhibit any further enlarging of thigh opening 929.

Figure 22:
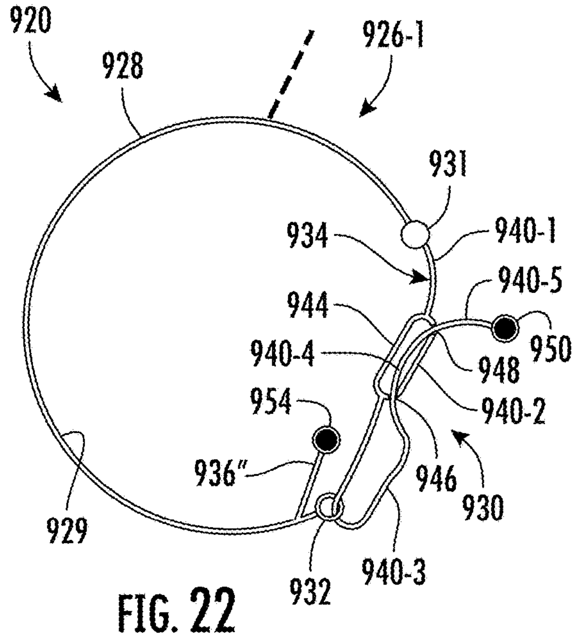
FIG. 22 is a diagram schematically illustrating portions of an example harness leg loop having an example circumference closing system.

In the example illustrated, tension release 936 comprises a flexible line having a free end with a head or handle 954. Tension release 936 is connected to third length 940-3 at a location between entry 946 of 2944 and second end portion 932. As indicated by broken lines, in some implementations, leg loop 926-1 may be provided with an alternative tension release 936'which is connected directly to constricting tube 944 proximate to entry 946, between outlet 948 and second end portion 932. As illustrated in FIG. 22, in some implementations, leg loop 926-1 may be provided with an alternative tension release 936" which is directly flexible perimeter 928 closer to second end portion 932 than first end portion 931 such that pulling of tension release 936" towards first end portion 931 reduces tension in constricting tube 944, permitting sliding movement of line 934 within two 944 and permitting expansion of thigh opening 929.

Figure 23:
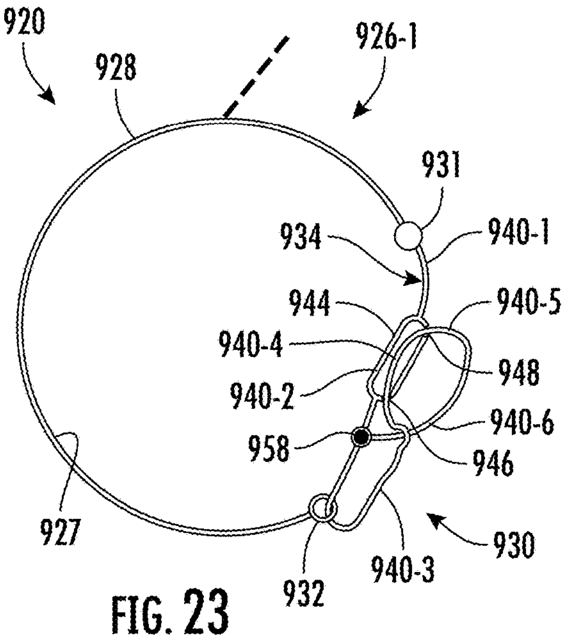
FIG. 23 is a diagram schematically illustrating portions of an example harness leg loop having an example circumference closing system.

As shown by FIG. 23, in some implementations, leg loop 92 may alternatively include a tension release provided in part by line 934 itself. In the example illustrated, line 934 comprises a sixth length 940-6 extending from the fifth length 940-5 and affixed to another portion of leg loop 926-1 so as to serve as a structure by which a person may temporarily reduce the degree or amount of tension of constricting tube 944. In the example illustrated, length 940-6 is secured at and 958 directly to third length 940-3 between constricting tube 944 and second end portion 932. In other implementations, end 958 may alternatively be secured to constricting tube 944 more proximate to entry 946 than outlet 948 (similar to the connection of tension release 936'). In yet other implementations, end 958 may be secured to flexible perimeter 928 at a location closer to second end portion 932 than first end portion 931 (similar to the connection of tension release 936").

In some implementations, line 934 is entirely exposed. In yet other implementations, each of leg loops 926 may provide with an outer flexible sheath or covering at least portions of line 934, wherein fifth length 940-5 is exposed extending out of the outer covering or sheath. In particular implementations where line 934 additionally comprises length 940-6, portions of length 940-6 may likewise be exposed outside of the sheath or covering.

Figure 24:
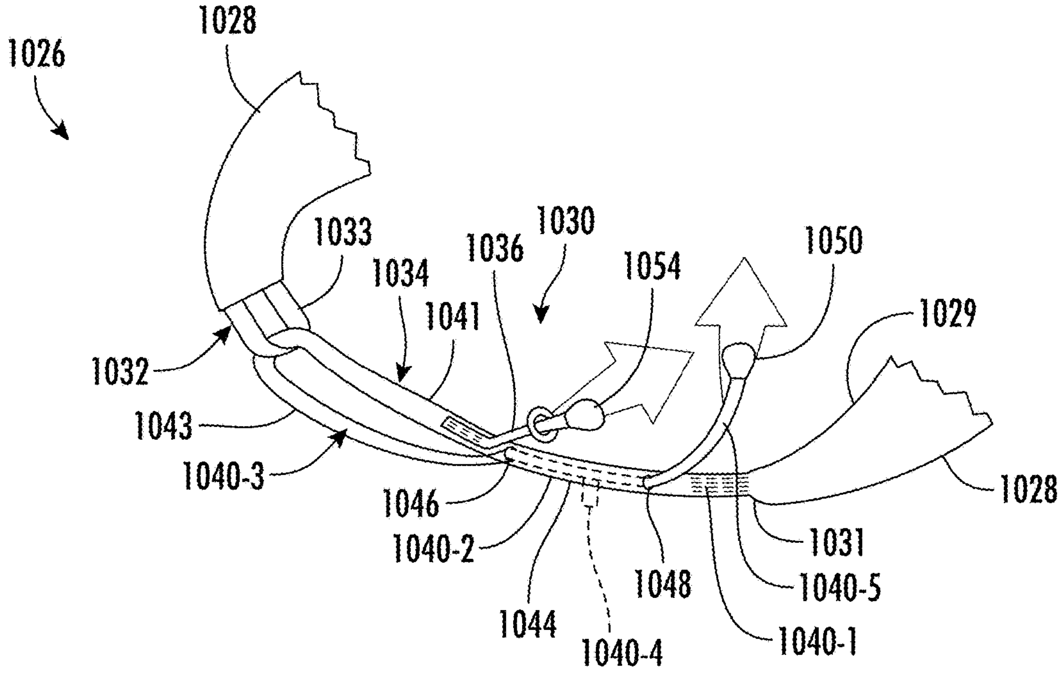
FIG. 24 is a perspective view illustrating portions of an example harness leg loop having an example circumference closing system.

FIG. 24 illustrates portions of an example harness leg loop 1026 for use as part of harness 920. Leg loop 1026 comprises a circumference closing system 1030 that provides an adjustable leg/thigh receiving opening 1029. Each of leg loops 1026 comprises a flexible perimeter 1028 defining a closable circumference about opening 1029, the flexible perimeter 1028 having a first end portion 1031 and a second end portion 1032. The flexible perimeter 1028 may be in the form of a strap, band or other member configured to wrap about the thigh of a person. In the illustrated example, the flexible perimeter 1028 has a varying width along its length, tapering at opposite ends to end portions 1031 and 1032.

In the example illustrated, second end portion 1032 comprises a loop or eyelet 1033. In the example illustrated, the eyelet 1033 is formed by a flexible piece of material, such as a flexible length of fabric or polymer affixed to and extending from a remainder of flexible tremor 1028. In other implementations, eyelet 1033 may be formed by a relatively rigid metal or polymer loop or ring affixed to the remainder of flexible perimeter 1028 at end portion 1032. In some implementations, eyelet 1033 may be replaced with a buckle affixed to flexible perimeter 1028 at second end portion 1032, wherein the buckle has a bar about which line 1034 (described below) may wrap or slidably extend through.

Each of the circumference closing systems 1030 of leg loops 1026 comprises a single continuous line 1034 and a tension release 1036. The single continuous line comprises a single elongate member having a first end and a second end. The single elongate member may be composed of one elongated member continuously extending from the first end to the second end without interruption or may comprise multiple segments joined end to end or joined to one another in an overlapping fashion between the first end and the second end. The single elongate member may be in the form of a rope, a cord, a strap, a band or the like. The single elongate member may be formed from a fabric or may be formed from one or more polymers or rubbers. The single elongate member may be solid, woven, braided or wound.

The single continuous line 1034 comprises a first length 1040-1, a second length 1040-2, a third length 1040-3, a fourth length 1040-4 and a fifth length 1040-5. In the example illustrated, the first length 1040-1 is fixed to the first end portion 1031. Fixed means that the first length is not removably connected to the first end portion; the first length may not be separated from the first end portion without damaging the either or both of the first length 1040-1 or the first end portion 1031. In the example illustrated, the first length 1040-1 affixed to the first end portion 1031 by stitching. In other implementations, the first length 1040-1 may be releasably connected to the first end portion 1031, such as with a hook, buckle or the like.

The second length 1040-2 extends between the first length 1040-1 and the third length 1040-3. The second length 1040-2 comprises a constricting tube 1044 configured to radially constrict in response to the tube 1044 being placed in tension (pulled in opposite directions or a first end being held in place while the second end is pulled away from the first end). In some implementations, the constricting tube 1044 is provided along a discrete portion of the single continuous line 934. In other implementations, the single continuous line 1034 may be in the form of a tube extending along an entirety of the length of line 1034, from its first end to its second end. In some implementations, the constricting tube comprises an elastic braided tube or an elastic woven tube. In some implementations, the constricting tube may be formed from a nonwoven or non-braided (solid) tube formed from an elastic polymer, rubber or synthetic rubber.

The third length 1040-3 is coupled to the second length 1040-2 such that pulling of the third length 1040-3 in a direction away from the first length 1040-1 results in constricting tube 1044 being placed in tension and constricting. The third length 1040-3 has a first portion 1041 extending away from the constricting tube 944 towards the second end portion 1032 and a second portion 1043 that is doubled back, extending back towards the constricting tube 1044. The third length 1040-3 is slidably coupled to the second end portion 1032 of flexible perimeter 1028 and doubles back to the constricting tube 1044 of the second length 1040-2. The term “slidably coupled” with respect to the second end portion 1032 means that the third length is directly connected to the second end portion and is slidable relative to the second end portion as it doubles back. Because third length is slidably coupled to the second end portion as it doubles back towards the constricting tube 1044, the third length may be pulled or released to adjust the total effective spacing or distance between the second end portion 1032 and constricting tube 1044, adjusting the internal diameter other sides of opening 1029.

In the example illustrated, the third length 1040-3 is coupled in a manner such that the second end portion slidably loops back on itself while extending between the second end portion 1032 and the fourth length 1040-4. In one implementation, the second end portion 1032 may comprise a loop or eyelet through which the second length 1040-2 slidably passes and doubles back. In yet another implementation, the second length 1040-2 slidably passes through a bar of a buckle before doubling back on itself towards a second length (the constricting tube 1044), wherein the buckle is captured within an eyelet provided at the second end portion 1032. In still other implementations, the second end portion 1032 may comprise a buckle, bar or the like, wherein third length 1040-3 wraps around the buckle, bar the like and turns back or doubles back on itself towards the constricting tube 1044.

Fourth length 1040-4 comprises that portion of line 1034 that currently resides within constricting tube 1044, entering constricting tube 1044 through an inlet 1046 proximate an end of tube 1044 closest to the second end portion 1032 and exiting constricting tube 1044 through an outlet 1048 proximate an end of tube 1044 closest to first end portion 1031. The particular actual portion of line 1034 currently residing in constricting tube 1044 may vary depending upon the current size of opening 1029 chosen by the person wearing leg loop 1026. Length 1040-4 is configured to slide within tube 1044 and to be gripped by the interior of tube and 44 when tube 1044 is placed in sufficient tension (when at least one of the ends of tube 1044 is being pulled away from the other of the ends of tube 1044).

Fifth length 1040-5 extends from portion 1040-4 beyond outlet 1048. In the example illustrated, fifth length 1040-5 terminates at a head 1050 shaped or sized so as to not be passable through outlet 1048. Head 1050 inhibits the complete retraction of line 1034 into constricting tube 1044 or even out of constricting tube 1044. In some implementations, head 1050 further provides a handle or gripping surface for a person to grasp line 1034 to pull line 1034 in a direction towards the first end portion 1031. Such pulling may increase the length of fifth length 1040-5 and may reduce the length of third length 1040-3, further reducing the size of thigh opening 1029. Manual release of length 1040-5 results in end portions 1031 and 1032 attempting or tending to move apart or away from one another to a less constricted state, exerting forces upon constricting tube 1044 in opposite directions. This results in constricting tube 1044 being placed in greater tension and results in constricting tube 1044 gripping and resisting sliding movement of fourth length 1040-4 out of constricting tube 1044, maintaining the spacing between second and portion 1032 and constricting tube 1044 and retaining the selected size for thigh opening 1029.

Tension release 1036 comprises a structure by which a person may temporarily reduce the degree or amount of tension of constricting tube 1044. Reducing the tension of tube 1044 permits tube 1044 to resiliently shorten while enlarging or expanding to a greater interior diameter or size. The greater interior diameter or size of tube 1044 reduces the grip on length 1040-4, permitting length 1040-4 to slide out of tube 1044 through entry 1046 and through outlet 1048 in the direction indicated by arrow 1052. As a result, the spacing between second end portion 1032 and constricting tube 1044 (and first end portion 1031) is increased, increasing the size of thigh opening 1029. Upon release of tension release 1036, constricting tube 1044 may once again return to an in-tension state in which tube 1044 once again grips the currently received length 1040-4 to restrict or inhibit further release of length 1040-4 from tube 1044 towards second end portion 1032 to inhibit any further enlarging of thigh opening 1029.

In the example illustrated, tension release 1036 comprises a flexible line having a free end having a head or handle 1054. Tension release 1036 is connected to third length 1040-3 (along portion 1041) at a location between entry 1046 of constricting tube 1044 and second end portion 1032. As described above with respect to FIGS. 21 and 22, tension release 1036 may be secured at other locations. In some implementations, tension release 1036 may be connected directly to constricting tube 1044 proximate to entry 1046, between outlet 1048 and second end portion 1032. Tension release 1036 may be directly connected to flexible perimeter 1028 closer to second end portion 1032 than first end portion 1031 such that pulling of the tension release 1036 towards first end portion 1031 reduces tension in constricting tube 1044, permitting sliding movement of line 1034 within tube 1044 and permitting expansion of thigh opening 1029. In still other implementations, as described above with respect to FIG. 23, tension release 1036 may be provided in part by line 1034 itself, wherein line 1034 comprises a sixth length 940-6 extending from the fifth length 940-5 and affixed to another portion of leg loop 926-1 so as to serve as a structure by which a person may temporarily reduce the degree or amount of tension of constricting tube 1044.

In some implementations, line 1034 is entirely exposed. In yet other implementations, leg loop 1026 may be provided with an outer flexible sheath or covering at least portions of line 1034, wherein fifth length 1040-5 is exposed extending out of the outer covering or sheath. In particular implementations where line 1034 additionally comprises length 940-6, portions of length 940-6 may likewise be exposed outside of the sheath or covering.

Figure 25:
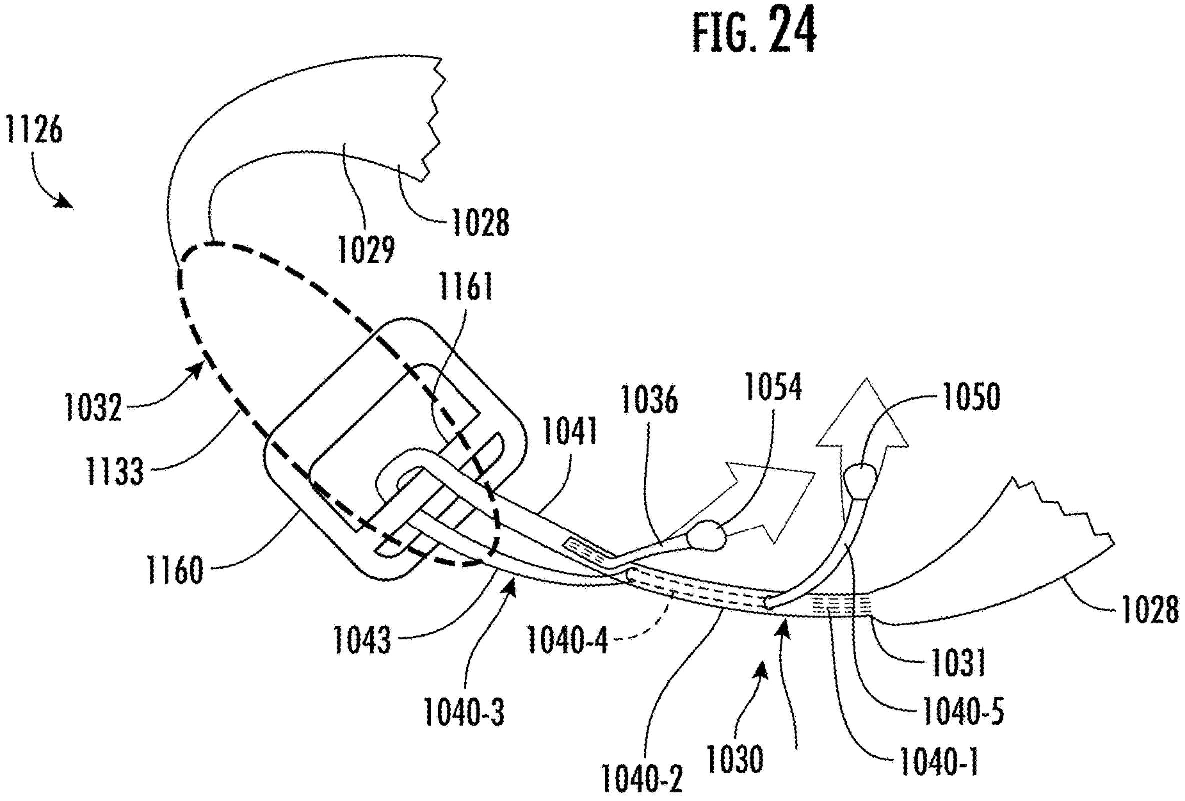
FIG. 25 is a perspective view illustrating portions of an example harness leg loop having an example circumference closing system.

FIG. 25 illustrates portions of an example leg loop 1126 which may be utilized in place of leg loop 926-1 and/or leg loop 926-2 in harness 920 described above. Leg loop 1126 is similar to leg loop 1026 described above except that second end portion 1032 comprises a loop, ring or eyelet 1133 in place of eyelet 1033 and that third length 1040-3 is indirectly slidably coupled to second end portion 1032 by an intermediate buckle 1160. Those remaining components of leg loop 1126 which correspond to components of leg loop 1026 are numbered similarly.

Eyelet 1033 comprises a circular member extending from or joined to flexible perimeter 1028 at end portion 1032. Eyelet 1033 is sized with an internal opening configured to receive buckle 1160, permitting buckle 1160 be passed through the internal opening. Eyelet 1033 is further sized and shaped such that once a buckle 1160 has passed through the internal opening of eyelet 1133, and once flexible perimeter 1028 with second end portion 1032 are in tension and/or once buckle 1160 has been reoriented relative to eyelet 1133, eyelet 1133 and buckle 1160 are releasably connected to one another such that they cannot be separated without withdrawal of buckle 1160 from eyelet 1133.

In one implementation, eyelet 1133 comprises a flexible cord or line forming a circular or oval loop through which buckle 1160 may be passed. The loop may have a larger or wider minimum diameter during reception of buckle 1160, such when in a circular shape when under tension, the eyelet 1133 may change shape to a more narrow oval as shown, having a smaller minimum diameter less than the width of buckle 1160. In other implementations, eyelet 1133 may be formed by a rigid polymer or metal ring through which buckle 1160 may pass in a first orientation, wherein the buckle 1160 is captured by eyelet 1133, and a second different orientation, an orientation that naturally occurs when leg loop 1126 is being worn or under tension.

Buckle 1160 comprise a body having a bar 1161 slidably supporting third length 1040-3. Third length 1040-3 loops about our wraps about bar 1161, doubling back to form portions 1041 and 1043. Buckle 1160 is passable through eyelet 1133 in a first orientation and/or while eyelet 1133 has a first shape and releasably locked or secured to eyelet 1133 and a second different orientation and/or when eyelet 1133 has a different shape. Although illustrated as generally rectangular, buckle 1160 may have a variety of other shapes and configurations.

FIGS. 26-31 illustrate portions of an example harness 1220. As shown may FIG. 26, harness 1220 comprises waist belt 1224 (sometimes referred to as a swami), tie-in risers 1225-1, 1225-2 (collectively referred to as tie-in risers 1225), leg loops 1226-1, 1226-2 and leg loop risers 1227-1, 1227-2 (collectively referred to as leg loop risers 1227). In the example illustrated, harness 1220 additionally comprise gear loops 1300 which hang from waist belt 1224 for attachment of gear. In some implementations, harness 1220 may comprise additional primary components that encircle or wrap about the shoulders and/or chest of the person wearing harness 1220.

Waist belt 1224 is configured to support leg loops 2126 from the waist of a person wearing harness 1220. Waist belt 1224 is further configured to be attached to a tether, rope, cable or other flexible line from which waist belt 1224 may be suspended from an upper support to limit an extent to which waist belt 1224 and the person wearing harness 1220 may fall from the upper support. Waist belt 1224 comprises band 1334 and connector 1337.

Band 1334 forms a flexible length that wraps about a majority of the waist of the person wearing harness 1220. Band 1334 is connected to tie-in risers 1225 on a front side and is connected to leg loop risers 1225 on a rear side. Band 1334 has opposite end regions 1336 which are connected to one another by connector 1337. Although band 1334 is illustrated as having a wider rear side that tapers to the front side, tapering to end regions 1336, in other implementations, band 1334 may have other profiles or shapes.

Connector 1337 connects an end region 1336 of band 1334. In the example illustrated, connector 1337 comprises a quick release buckle or side release buckle, permitting at least one end of connector 1337 to be temporarily disconnected from an end region 1336 of band 1334. In other implementations, end portion 3036 may be releasably connected to one another in other fashions with other mechanisms.

Figure 26:
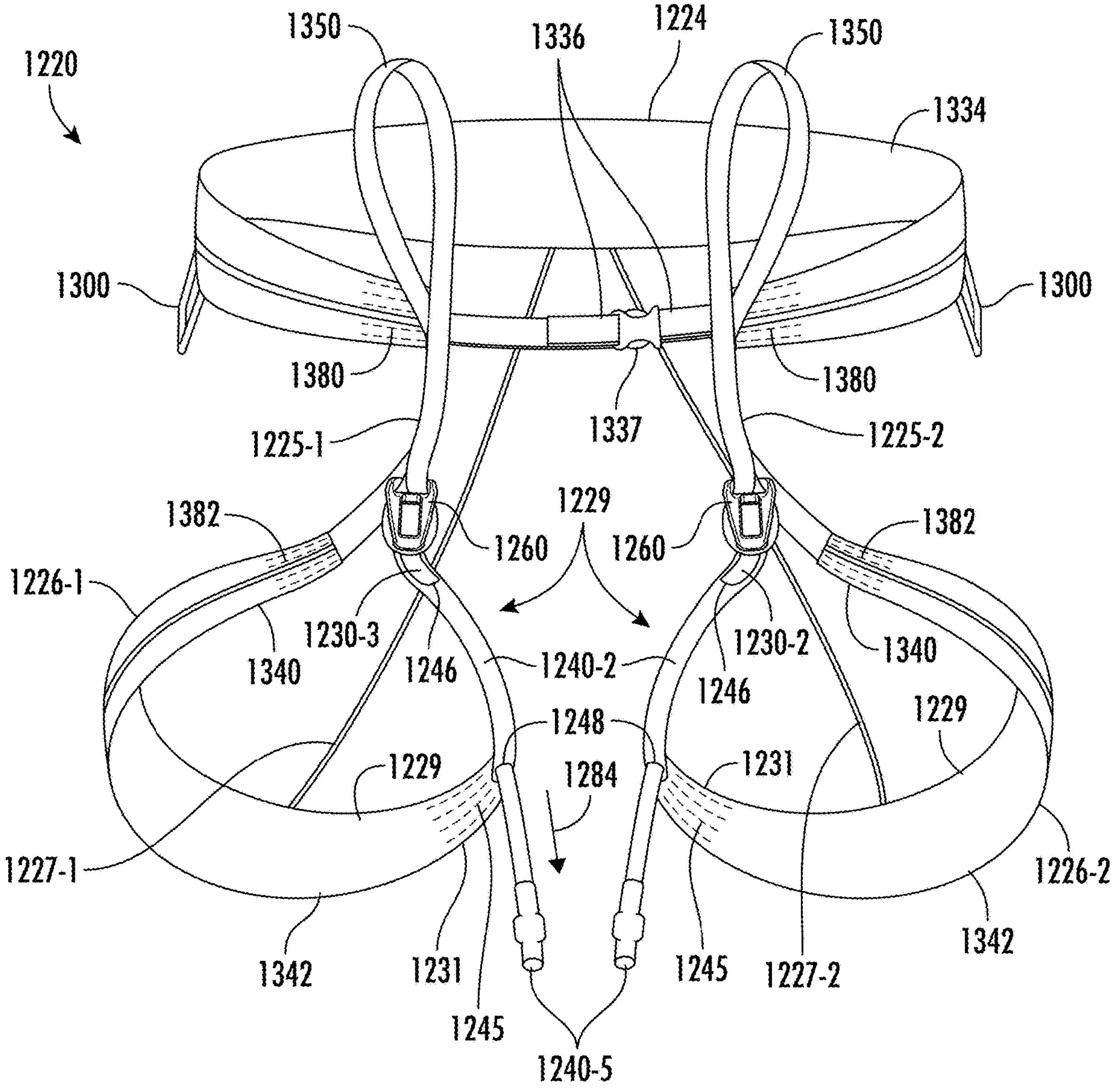
FIG. 26 is a perspective view of an example harness having example leg loops with example harness closing systems providing the leg loops with a first size.
Figure 27:
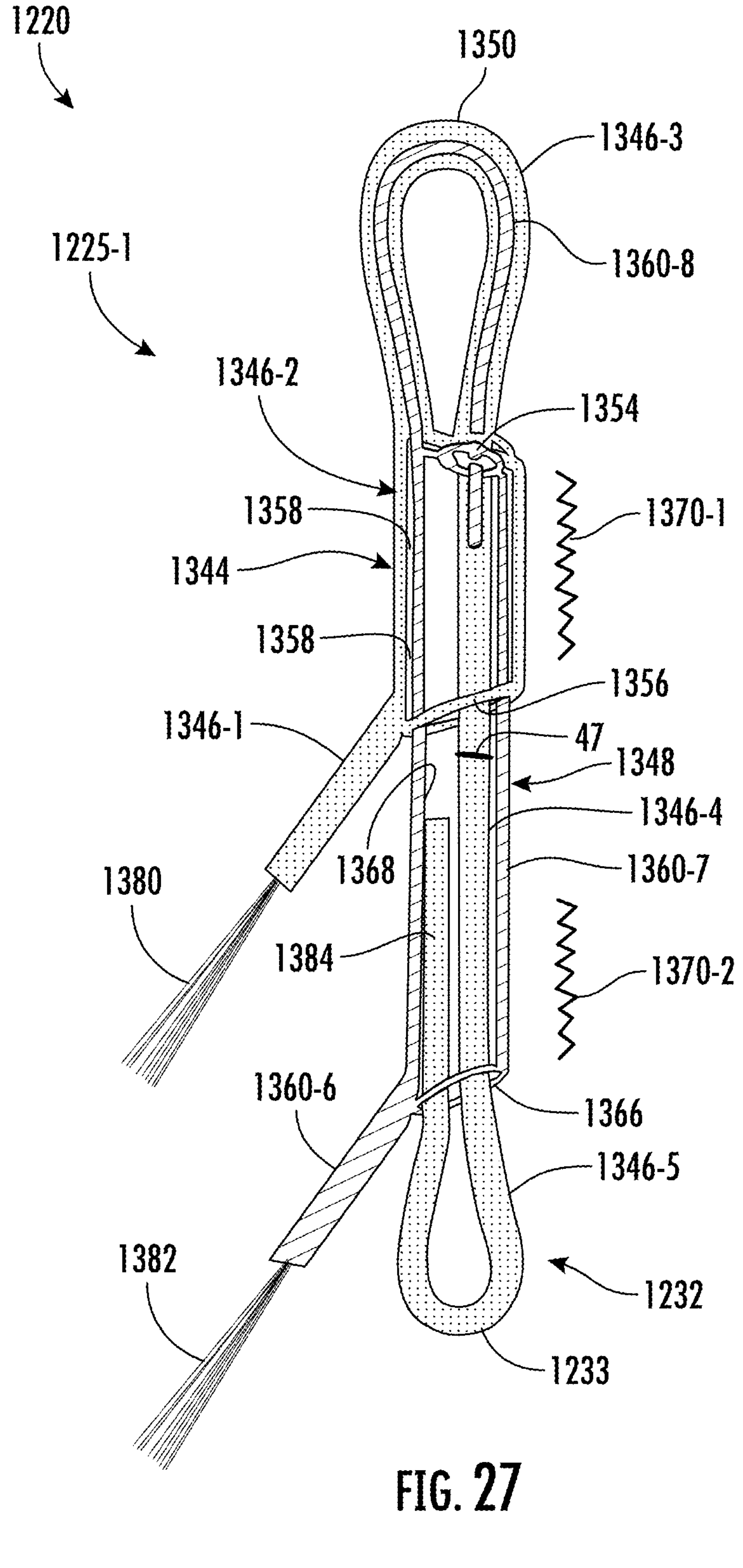
FIG. 27 is a sectional view illustrating portions of an example tie-in riser of the example harness of FIG. 26.

Tie-in risers 1225 are each similar to one another. FIG. 27 is a partial sectional view of tie-in riser 1225-1. Tie-in riser 1225-1 comprises first and second lines 1344, 1348 that are spliced together. For purposes of illustration, in FIG. 26, the exposed extents of lines 1344 and 1348 of tie-in riser 1225-1 are indicated by different corresponding stippling. Those portions of lines 1344 and 1348 of tie-in riser 1225-1 that are partially coextensive with band 1334 and leg loops 1226-1, but internally within the band 1334 and leg loop 1225-1, are also indicated by the first stippling corresponding to line 1344 and a second different stippling corresponding to line 1348.

As shown by FIG. 27, the first line 1344 has a portion 1346-1 connected to the band 1334 of waist belt 1224 described above) and a portion 1346-5 connected to a first end region 1340 of the band 1342 of the associated leg loop 1226-1. As shown by FIG. 26, band 1342 forms a flexible perimeter that is configured to wrap about a majority of the thigh of the person wearing harness 1220. Band 1342 is joined at one end to line 1344 and is joined to a line 1234 at another end. As we described hereafter, the line 1234 provides leg loop 1226-1 with an adjustable inner diameter or size 1270. Although band 1342 is illustrated as having a wider midsection that tapers to the ends, in other implementations, band 1342 may have other profiles or shapes.

Portion 1346-1 of line 44 has a splayed end 1380 (sometimes referred to as a horse tail) with fibers or strands that fan out or spread out across an adjacent portion of band 1334 to distribute tensile forces across the width of band 1334. Similarly, portion 1360-6 of line 1348 has a splayed end 1382 (sometimes referred to as a horse tail) with fibers or strands that fan out or spread out across a width of an adjacent portion of band 1342 of leg loop 1226-1 to distribute tensile forces across the width of the band 1342 forming the flexible perimeter of leg loop 1226-1.

As further shown by FIG. 27, line 1344 further comprises a portion 1346-5 that doubles back with a tail 1384 affixed to line 1348 to form an end portion 1232 having an eyelet 1233. Eyelet 1233 functions similarly to eyelet 1033 or eyelet 1133 described above. Line 1344 further comprises a portion 1346-3 between the first portion 1346-1 and the second portion 1346-5 to form a loop that serves as the belay tie-in point eye 1350. The second line 1348 passes along and within the portion 1346-3 of the first line that forms the belay tie-in point eye 50.

In the example illustrated, in addition to portions 1346-1, 1346-3 and 1346-5, the first line 1344 comprises portions 1346-2 and 1346-4. Portion 1346-2 extends between portions 1346-1 and 1346-3. Portion 1346-2 comprises side entrances or openings 1354, 1356 and interior 1358. Portion 1346-4 extends between portion 1346-3 and 1346-5. Portion 1346-4 passes through interior 1358, entering interior 1358 through side opening 1354 and exiting interior 1358 through side opening 1356.

In the example illustrated, second line 1348 comprises portions 1360-6, 1360-7 and 1360-8. As described above, portion 1360-6 is connected to end region 1340 of leg loops 1226-1. Portion 1360-7 passes through the interior 1358 of portion 1346-2 of line 1344. Portion 1360-8 extends along the tie-in point eye 1350 within the interior of portion 1346-3. Portion 1360-7 extends between portions 1360-6 and 1360-8. In the example illustrated, portion 1360-7 enters interior 1358 through side opening 1356.

In the example illustrated, portion 1360-7 comprises side entrances or openings 1364, 1366 and an interior 1368 between side openings 1364, 1366. In the example illustrated, side opening 1364 is aligned with side opening 1354. In the example illustrated, the interior 1368 of portion 1360-7 is received within the interior 1358 of portion 1346-2. Portion 1346-4 of line 1344 enters interior 1368 through side openings 1364 and exits interior 1368 through side opening 1366, from which portion 1346-5 extends.

In the example illustrated, portion 1346-2 is secured to portion 1346-4 so as to inhibit relative sliding movement between such portions. Portion 1346-2 is further secured to portion 1360-7 to inhibit relative sliding movement between such portions. Portion 1346-4 is secured to portion 1360-7 to inhibit relative sliding movement between such portions. In the example illustrated, a stitch 1370-1 extends through and secures portions 1346-2, 1346-4 and 1360-7 to one another against relative sliding movement. In other implementations, multiple stitches may be used to individually secure pairs of portions or groups of portions to one another. In still other implementations, welds, bonds, glues, adhesives or the like may be used to secure such portions to one another.

In the example illustrated, portion 1360-7 is secured to portion 1346-4 to inhibit relative sliding movement of such portions. In the example illustrated, a stitch 1370-2 extends through and secures portion 1360-7 and 1346-4 against relative sliding movement. In other implementations, welds, bonds, glues, adhesives or the like may be used to secure such portions to one another. The example tie-in risers 1225 integrate with both the waist belt 1224 and a respective one of the leg loops 1226 through the inter-splining of lines 1344 and 1346 to enhance the strength and durability of harness 1220 while making harness 20 compact and lightweight.

Figure 28:
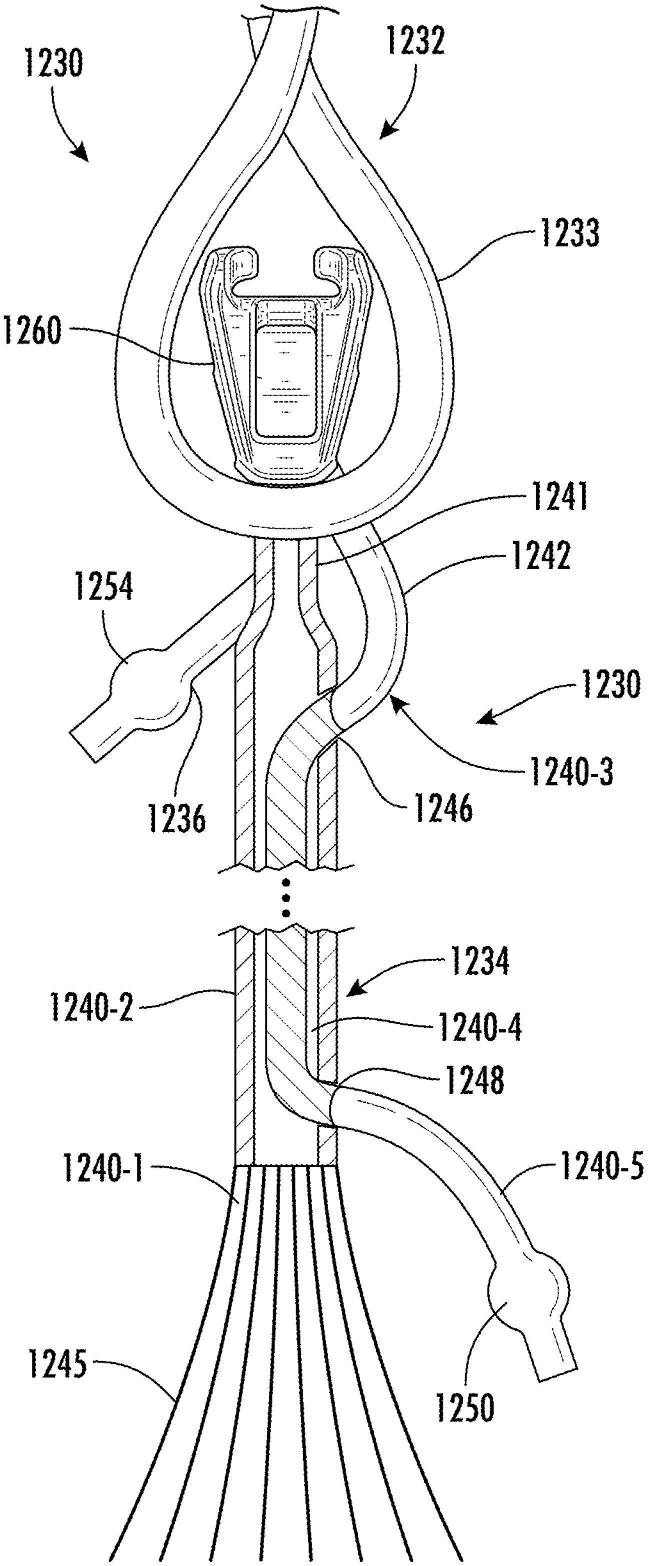
FIG. 28 is a fragmentary view with portions shown in section 2 illustrate an example circumference closing system of a leg loop of the harness of FIG. 26.

As shown by FIGS. 26 and 28, each of leg loops 1226-1 comprises a circumference closing system 1230 which serves as a leg loop constriction or size adjustment mechanism. Circumference closing system 1230 performs in a fashion similar to that of circumference closing system 930. Circumference closing system 1230 is integrated as part of the band 1342 forming the flexible perimeter of the leg loop. Circumference closing system 1230 comprises a single continuous line 1234 and a tension release 1236. The single continuous line comprises a single elongate member having a first end and a second end. The single elongate member may be composed of one elongated member continuously extending from the first end to the second end without interruption or may comprise multiple segments joined end to end or joined to one another in an overlapping fashion between the first end and the second end. The single elongate member may be in the form of a rope, a cord, a strap, a band or the like. The single elongate member may be formed from a fabric or may be formed from one or more polymers. The single elongate member may be woven, braided or wound.

The single continuous line 1234 comprises a first length 1240-1, a second length 1240-2, a third length 1240-3, a fourth length 1240-4 and a fifth length 1240-5. In the example illustrated, the first length 1240-1 is fixed to the first end portion 1231. Fixed means that the first length is not removably connected to the first end portion; the first length may not be separated from the first end portion without damaging the either or both of the first length 1340-1 or the first end portion 1330. In the example illustrated, the first length 1340-1 has a splayed end 1245 affixed to the first end portion 1231 by stitching. The splayed end 1245 (sometimes referred to as a horse tail) comprises an array of fibers or strands that fan out or spread out across an adjacent portion of band 1342 of leg loop 1226-1 to distribute tensile forces across the width of the band 1342 forming the flexible perimeter of leg loop 1226-1. In other implementations, the first length 1040-1 may be releasably connected to the first end portion 1031, such as with a hook, buckle or the like.

The second length 1240-2 extends between the first length 1240-1 and the third length 1240-3. The second length 1240-2 comprises a constricting tube 1244 configured to radially constrict in response to the tube 1244 being placed in tension (pulled in opposite directions or a first end being held in place while the second end is pulled away from the first end). In the illustrated example, the single continuous line 1234 may be in the form of a tube extending along an entirety of the length of line 1034, from its first end to its second end, wherein those particular portions of the continuous tube that receive the fourth length 1240-4 may expand outwardly when not under tension to have a greater interior diameter. In other implementations, the constricting tube 1244 is provided along a discrete portion of the single continuous line 1234. In some implementations, the constricting tube 1244 of the second length 1240-2 comprises an elastic braided tube or an elastic woven tube. In some implementations, the constricting tube may be formed from a nonwoven or non-braided (solid) tube formed from an elastic polymer, rubber or synthetic rubber.

The third length 1240-3 is coupled to the second length 1240-2 such that pulling of the third length 1240-3 in a direction away from the first length 1240-1 results in constricting tube 1244 being placed in tension and constricting. The third length 1240-3 has a first portion 1241 extending away from the constricting tube 1244 towards the second end portion 1232 and a second portion 1043 that is doubled back, extending back towards the constricting tube 1244. The third length 1040-3 is slidably coupled to the second end portion 1032 of flexible perimeter 1028 and doubles back to the constricting tube 1244 of the second length 1240-2. The term "slidably coupled" with respect to the second end portion 1232 means that the third length is directly connected to the second end portion and is slidable relative to the second end portion as it doubles back. Because third length 1240—is slidably coupled to the second end portion 1232 as it doubles back towards the constricting tube 1244, the third length may be pulled or released to adjust the total effective spacing or distance between the second end portion 1232 and constricting tube 1244, adjusting the internal diameter other sides of opening 1229.

In the example illustrated, the third length 1240-3 is coupled to the second end portion 1232 in a manner such that the third length 1240-3 slidably loops back on itself while extending between the second end portion 1232 and the fourth length 1240-4. In the illustrated example, the third length 1240-3 slidably passes about a bar 1261 (shown in FIG. 31) of a buckle 1260 before doubling back on itself towards the second length 1240-2 (the constricting tube 1244), wherein the buckle 1260 is captured within the eyelet 1233 provided at the second end portion 1232 (similar to what is shown in FIG. 25). In still other implementations, the second end portion 1232 may comprise a buckle, bar or the like, wherein third length 1240-3 wraps around the buckle, bar or the like and turns back or doubles back on itself towards the constricting tube 1244. In still other implementations, the second end portion 1232 may comprise a loop or eyelet through which the third length 1240-3 slidably passes and doubles back (similar to what is shown in FIG. 24).

Fourth length 1240-4 comprises that portion of line 1234 that currently resides within constricting tube 1244, entering constricting tube 1244 through an inlet 1246 proximate an end of tube 1244 closest to the second end portion 1232 and exiting constricting tube 1244 through an outlet 1248 proximate an end of tube 1244 closest to first end portion 1231. The particular actual portion of line 1234 currently residing in constricting tube 1244 may vary depending upon the current size of opening 1229 chosen by the person wearing leg loop 1226. Length 1240-4 is configured to slide within tube 1244 and to be gripped by the interior of tube 1244 when tube 1244 is placed in sufficient tension (when at least one of the ends of tube 1244 is being pulled away from the other of the ends of tube 1244).

Fifth length 1240-5 extends from portion 1240-4 beyond outlet 1248. In the example illustrated, fifth length 1240-5 terminates at a head 1250 shaped or sized so as to not be passable through outlet 1248. Head 1250 inhibits the complete retraction of line 1234 into constricting tube 1244 or even out of constricting tube 1244. In some implementations, head 1250 further provides a handle or gripping surface for a person to grasp line 1234 to pull line 1234 in a direction towards the first end portion 1231.

As shown by FIG. 26, pulling of fifth length 1240-5 in the direction indicated by arrow 1284 increases the length of fifth length 1240-5 and reduces the length of third length 1240-3, further reducing the size of thigh opening 1229. Manual release of length 1240-5 results in end portions 1231 and 1232 attempting or tending to move apart or away from one another to a less constricted state, exerting forces upon constricting tube 1244 in opposite directions. This results in constricting tube 1244 being placed in greater tension and results in constricting tube 1244 gripping and resisting sliding movement of fourth length 1040-4 out of constricting tube 1044, maintaining the spacing between second and portion 1232 and constricting tube 1244 and retaining the selected size for thigh opening 1229.

Figure 29:
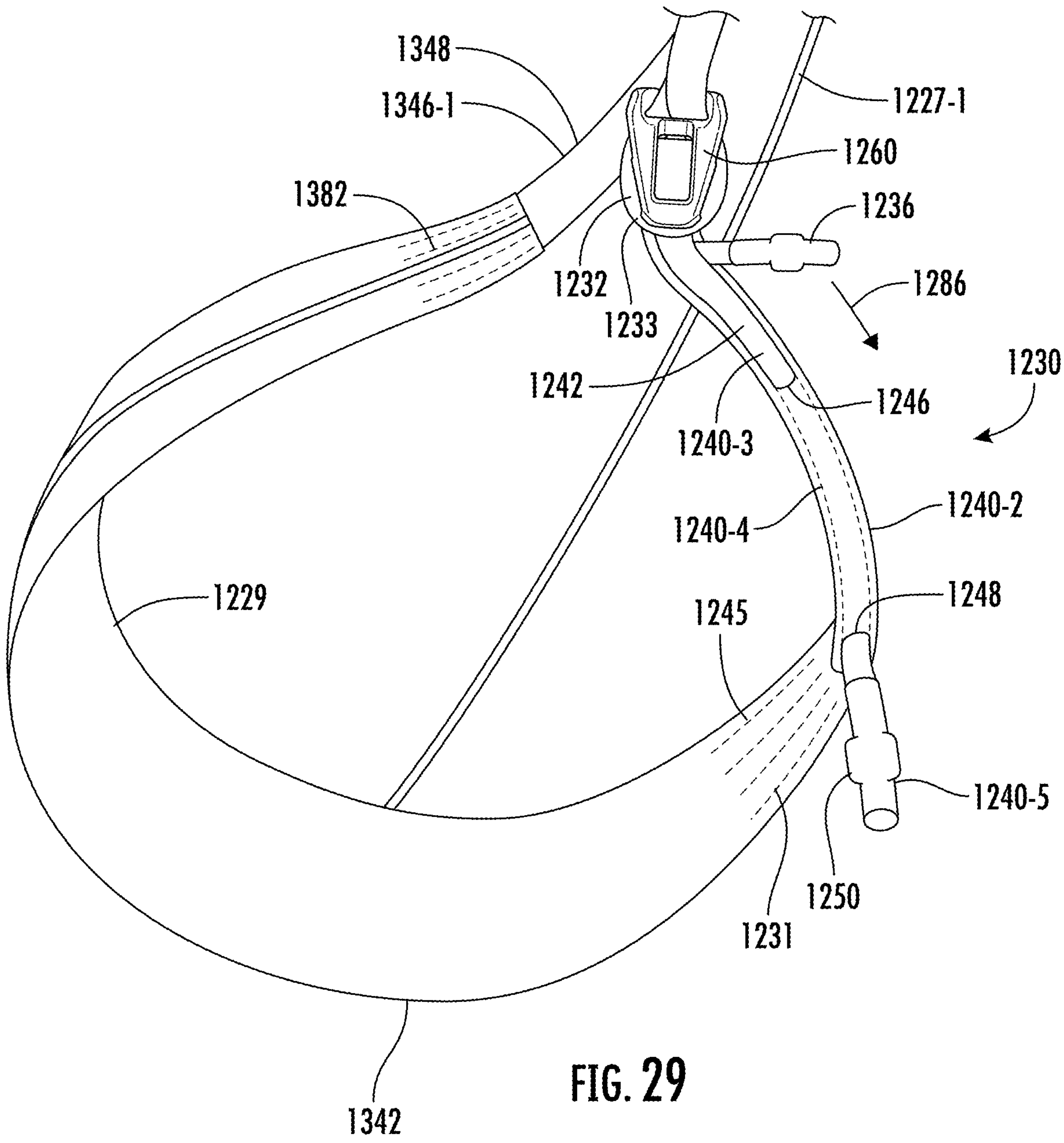
FIG. 29 is a perspective view illustrating an example leg loop of the harness of FIG. 26 with the example circumference closing system providing the leg loop with a second size.

Tension release 1236 comprises a structure by which a person may temporarily reduce the degree or amount of tension of constricting tube 1244. In the example illustrated, tension release 1236 comprises a flexible line having a free and having a head or handle 1254. Tension release 1236 is connected to third length 1240-3 (along portion 1241) at a location between entry 1246 of constricting tube 1244 and second end portion 1232. FIG. 29 illustrates the result of tension release 1236 being manually pulled in the direction indicated by arrow 1286. As result, the degree or amount of tension of constricting tube 1244 is reduced. Reducing the tension of tube 1244 permits tube 1044 to resiliently shorten while enlarging or expanding to a greater interior diameter or size. The greater interior diameter or size of tube 1244 reduces the grip on length 1240-4, permitting length 1240-4 to slide out of tube 1244 through entry 1246 and through outlet 1248 in the direction indicated by arrow 1252. As a result, the spacing between second end portion 1232 and constricting tube 1244 (and first end portion 1231) is increased, increasing the size of thigh opening 1029. Upon release of tension release 1236, constricting tube 1244 may once again return to an in-tension state in which tube 1244 once again grips the currently received length 1040-4 to restrict or inhibit further release of length 1240-4 from tube 1244 towards second end portion 1232 to inhibit any further enlarging of thigh opening 1229.

As described above with respect to FIGS. 21 and 22, tension release 1236 may be secured at other locations. In some implementations, tension release 1236 may be connected directly to constricting tube 1244 proximate to entry 1246, between outlet 1248 and second end portion 1232. Tension release 1236 may be directly connected to flexible perimeter 1228 closer to second end portion 1232 than first end portion 1231 such that pulling of the tension release 1236 towards first end portion 1231 reduces tension in constricting tube 1244, permitting sliding movement of line 1234 within tube 1244 and permitting expansion of thigh opening 1229. In still other implementations, as described above with respect to FIG. 23, tension release 1236 may be provided in part by line 1234 itself, wherein line 1234 comprises a sixth length 940-6 extending from the fifth length 940-5 and affixed to another portion of leg loop 926-1 so as to serve as a structure by which a person may temporarily reduce the degree or amount of tension of constricting tube 1044.

In the illustrated example, line 1234 is entirely exposed. In yet other implementations, leg loop 1226 may be provided with an outer flexible sheath or covering at least portions of line 1234, wherein fifth length 1240-5 is exposed extending out of the outer covering or sheath. In particular implementations where line 1234 additionally comprises length 940-6, portions of length 940-6 may likewise be exposed outside of the sheath or covering.

Figure 30:
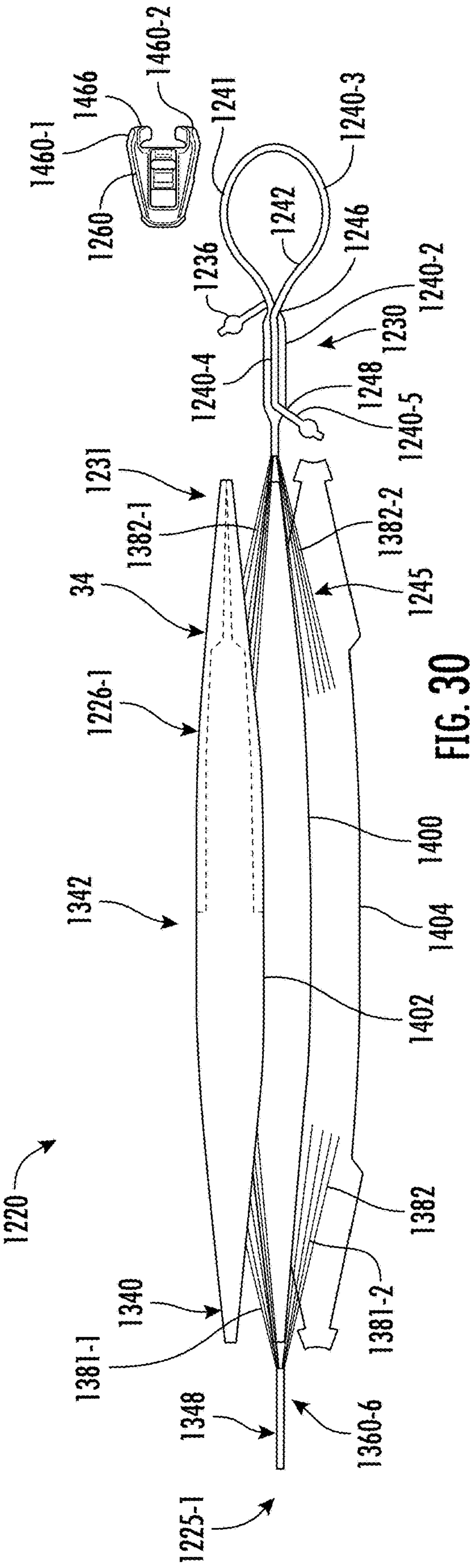
FIG. 30 is an exploded perspective view illustrating an example leg loop for the example harness of FIG. 26.
Figure 31:
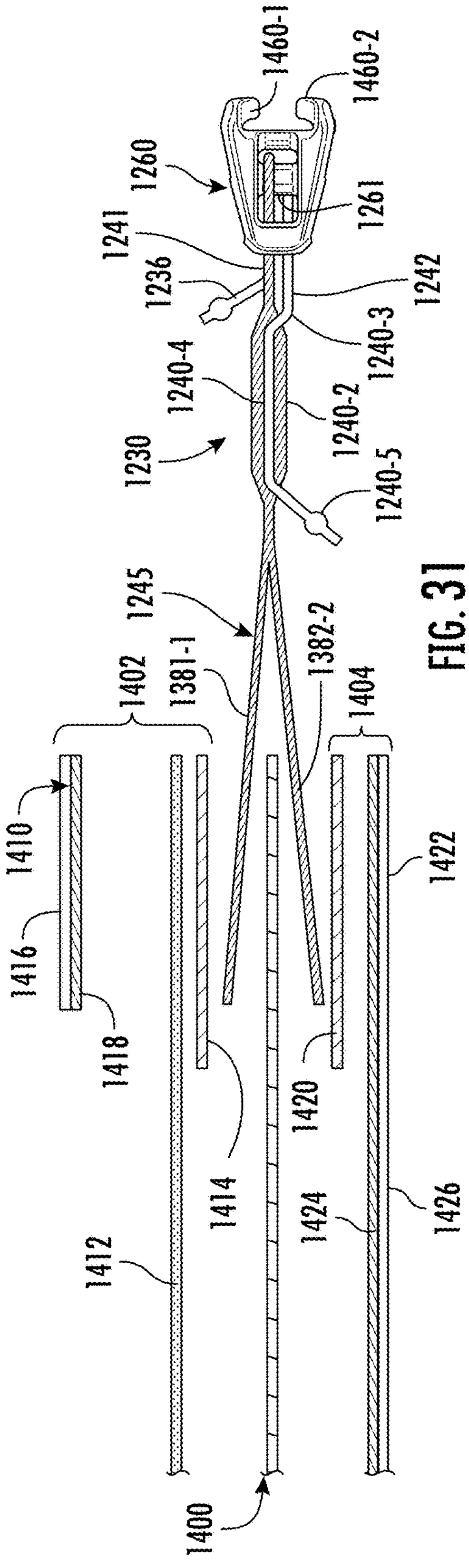
FIG. 31 is an exploded sectional view illustrating a right side of the example leg loop of FIG. 30.

FIGS. 30-31 illustrate one example of how band 1342 may be integrated and fixed to both portion 1360-6 of line 1348 of riser 1225-1 and circumference closing system 1230. In the example illustrated in FIGS. 30 and 31, In the example illustrated in FIG. 30, band 1342 comprises band panels 1400, 1402 and 1404.

Panel 1400 is sandwiched between panels 1402 and 1404. Panel 1400 has a wide central portion and tapers to end region 1340 and end portion 1231. Panel 1400 is further sandwiched between different portions 1481-1, 4181-2 of splayed end 1382 and between different portions 1382-1, 1382-2 of splayed end 1245. Panel 1402 has a wide central portion that tapers to towards its ends. Panel 1402 extends over portions 1381-1 and 1382-1. Panel 1404 has a wide central portion that tapers towards its ends. Panel 1404 extends below portions 1381-2 and 1382-2. Panels 1400, 1402 and 1404 are secured to one another provide an enhanced strength to band 1342 for leg loop 1226-1. Leg loop 1226-2 may have a similar construction.

FIG. 31 is a sectional view illustrating one example of the right side of leg loop 1226-1 shown in FIG. 30. In the example shown in FIG. 30, panel 1402 comprises a stack of multiple films 1410, 1412 and 1414 that are laminated to one another. Film 1410 comprises a laminate formed by an outer layer 1416 and an inner layer 1418. Outer layer 1416 comprises an ultrahigh molecular weight polyethylene film with the ultraviolet (UV) protective coating (protects against US damage) and greater abrasion resistance as compared to layer 1418. In one example implementation, layer 1416 comprises an ultrahigh molecular weight polyethylene film in the form of an ultralight composite textile material commercially available under the tradename ALUULA™. Layer 1418 comprises a low density polyethylene film having a lower melting point than layer 1416 and being softer than layer 416. Layer 418 facilitates bonding to film 1412 while layer 1416 provides protection or resistance against UV damage or abrasion.

Film 1412 comprise the high density polyethylene film having a higher melting point than layer 1418. Film 1412 also includes a UV protective coating and has enhanced abrasion resistance as compared to layer 1418. Film 1414 comprises a thermoplastic polymer configured to facilitate bonding of panel 1400 and film 1412. In the example illustrated, film 1414 comprises a polyolefin having a melting point greater than layer 1418 but less than layer 1416.

Panel 1400 is formed from material configured to facilitate bonding to panels 402 and 404. In one implementation, panel 1400 comprises a material similar to that of layer 1418. In one implementation, panel 1400 comprises a low density polyethylene film.

Panel 1404 comprises films 1420 and 1422. Film 1420 is similar to film 1414. Film 1422 is similar to film 1410. Film 1422 comprises a layer 1424 which is similar to layer 1418 and layer 1426 which is similar to layer 1416.

Figure 32:
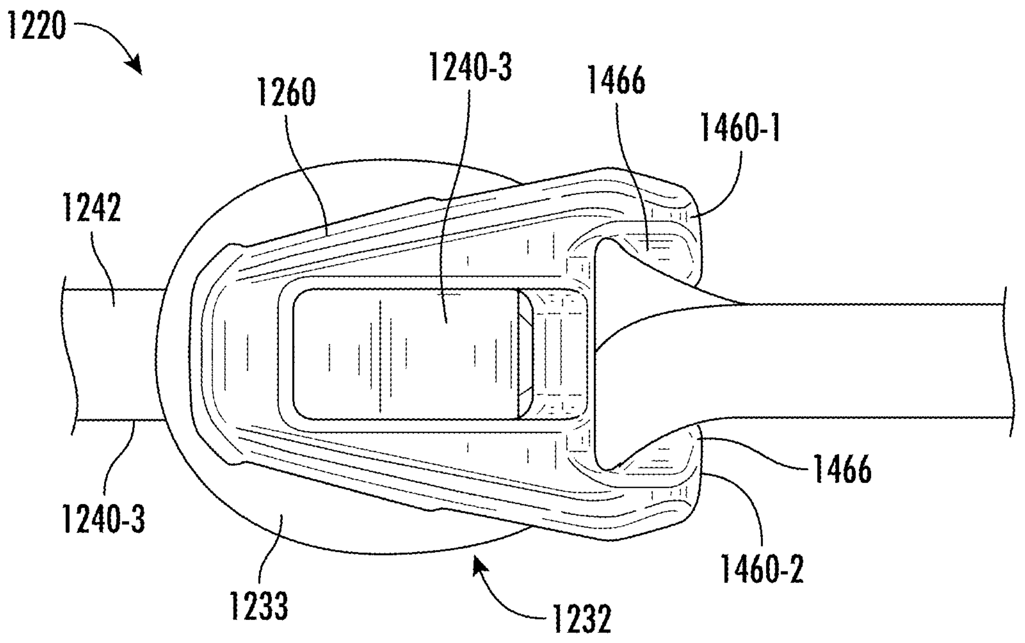
FIG. 32 is a top perspective view illustrating releasable connection of the circumference closing system to the example tie-in riser of FIG. 27.
Figure 33:
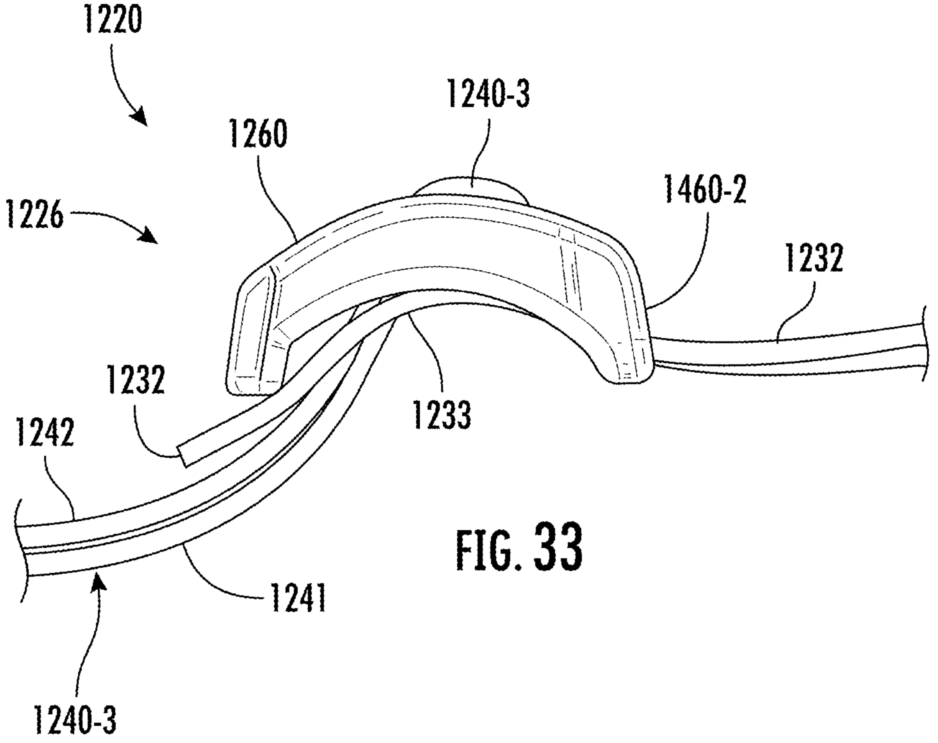
FIG. 33 is a side view of the releasable connection shown in FIG. 32.

FIGS. 32 and 33 illustrate the example buckle 1260 and its connection with eyelet 1233 of second end portion 1232. As shown by FIGS. 32 and 33, once the body 1434 of buckle 424 has passed through opening of eyelet 1233, the eyelet 1233 and/or connected portions second end portion 1232 are lifted and inwardly moved or bent so as to position portions of eyelet 1233 and/or second end portion 1232 above and between arms 1460-1 and 1460-2 and into a channel 1466 formed by the bottom face of buckle 1260 and retention arms 1460, inhibiting withdrawal from the channel 1466. As result, the eyelet 1233 or the second end portion 1232 are captured and held within the channel 1466 against the bottom face 1 of the buckle 1260 to resist movement of the eyelet 1233 away from the buckle 1260 and to resist inadvertent passing of the buckle 1260 back through the eyelet 1230. The retention arms 1460 further inhibit inadvertent rotation of the eyelet 1233 relative to the buckle 1260 (such as when the buckle 1260 and the eyelet 1233 are not in tension) to maintain the eyelet 1230 about the buckle 1260. In some implementations, the inwardly extending arms 1460 may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harness leg loop having an adjustable leg receiving opening, the harness leg loop comprising:

a flexible perimeter defining a closable circumference, the flexible perimeter having a first end portion and a second end portion;

a single continuous line comprising:

a first length fixed to the first end portion;

a second length extending from the first length and comprising a constricting tube;

a third length extending from the second length, joined to the second end portion, and slidably doubling back to the constricting tube of the second length;

a fourth length extending from the third length through the constricting tube, entering the constricting tube through an inlet and exiting the constricting tube through an outlet; and a fifth length extending from the fourth length beyond the outlet, wherein the constricting tube of the second length is configured to grip the fourth length when under tension to inhibit withdrawal of the fourth length from the constricting tube to maintain a size of the leg receiving opening; and a tension release coupled to the second length between the fourth length and the second length such that pulling of the tension release towards the first length reduces tension in the constricting tube of the second length causing the constricting tube to release the fourth length and permit the size of the leg receiving opening to be enlarged.

2. The harness leg loop of claim 1, wherein the second end portion comprises an eyelet through which the third length passes.

3. The harness leg loop of claim 1 further comprising a buckle having a bar about which the third length wraps, wherein the second end portion comprises an eyelet removably receiving the buckle.

4. The harness leg loop of claim 1, wherein the tension release is directly connected to the third length.

5. The harness leg loop of claim 1, wherein the tension release is directly connected to the second end portion.

6. The harness leg loop of claim 1, wherein the tension release comprises a free end.

7. The harness leg loop of claim 1 wherein the tension release comprises a sixth length of the single continuous line, the sixth length extending from the fifth length on an opposite side of the fifth length as the fourth length.

8. The harness leg loop of claim 1, wherein the constricting tube comprises a braided tube.

9. The harness leg loop of claim 1, wherein the constricting tube extends from a first end of the single continuous line to a second end of the single continuous line.

10. A harness comprising:
- a waist belt; and
- a leg loop connected to the waist belt, the leg loop comprising:
  - a flexible perimeter defining a closable circumference, the flexible perimeter having a first end portion and a second end portion;
  - a single continuous line comprising:
  - a first length fixed to the first end portion;
  - a second length extending from the first length and comprising a constricting tube;
  - a third length extending from the second length, joined to the second end portion, and slidably doubling back to the constricting tube of the second length;
  - a fourth length extending from the third length through the constricting tube, entering the constricting tube through an inlet and exiting the constricting tube through an outlet; and
  - a fifth length extending from the fourth length beyond the outlet, wherein the constricting tube of the second length is configured to grip the fourth length when under tension to inhibit withdrawal of the fourth length from the constricting tube to maintain a size of the leg receiving opening; and
- a tension release coupled to the second length between the fourth length and the second length such that pulling of the tension release towards the first length reduces tension in the constricting tube of the second length causing the constricting tube to release the fourth length and permit the size of the leg receiving opening to be enlarged.

11. The harness of claim 10, wherein the first end portion is connected to the waist belt.

12. The harness of claim 10, wherein the second end portion comprises an eyelet through which the third length passes.

13. The harness of claim 10 further comprising a buckle having a bar about which the third length wraps, wherein the second end portion comprises an eyelet removably receiving the buckle.

14. The harness of claim 10, wherein the tension release is directly connected to the second length.

15. The harness claim 10, wherein the tension release is directly connected to the second end portion.

16. The harness of claim 10, wherein the tension release comprises a free end.

17. The harness of claim 10 wherein the tension release comprises a sixth length of the single continuous line, the sixth length extending from the fifth length on an opposite side of the fifth length as the fourth length.

18. The harness of claim 10, wherein the constricting tube comprises a braided tube.

19. The harness of claim 10, wherein the constricting tube extends from a first end of the single continuous line to a second end of the single continuous line.

20. The harness of claim 10 further comprising:
- a second line comprising:
  - a first side opening;
  - a second side opening; and
  - a first interior between the first side opening and the second side opening; and
- a third line, wherein the second line further comprises:
  - a first portion connected to the waist belt;
  - a second portion forming the first interior;
  - a third portion entering the first interior through first side opening to form a tie-in point eye;
  - a fourth portion exiting the first interior through the second side opening; and
  - a fifth portion forming the second end portion of the leg loop, wherein the third line further comprises:
  - a sixth portion forming the first end portion of the leg loop;
  - a seventh portion passing through the first interior of the second portion; and
- an eighth portion extending along the tie-in point eye within the third portion.

* * * * *